United States Patent
Agnew et al.

(10) Patent No.: US 10,658,843 B2
(45) Date of Patent: May 19, 2020

(54) DC COUPLED POWER ELECTRONICS SYSTEM FOR A FUEL CELL POWER SYSTEM

(71) Applicant: ROLLS-ROYCE PLC, London (GB)

(72) Inventors: Gerard Daniel Agnew, Uttoxeter (GB);
David Silveira Erel, Derby (GB);
Jaeyoo Yoo, North Canton, OH (US);
Joseph J. Romayo, Louisville, OH (US); Jinha Lee, North Canton, OH (US)

(73) Assignee: Rolls-Royce plc, London (GB)

( * ) Notice: Subject to any disclaimer, the term of this patent is extended or adjusted under 35 U.S.C. 154(b) by 206 days.

(21) Appl. No.: 15/604,380

(22) Filed: May 24, 2017

(65) Prior Publication Data
US 2018/0342876 A1    Nov. 29, 2018

(51) Int. Cl.
| | |
|---|---|
| H02J 3/38 | (2006.01) |
| H02J 9/06 | (2006.01) |
| H02J 3/00 | (2006.01) |
| H02J 11/00 | (2006.01) |
| H01M 16/00 | (2006.01) |
| H02J 1/00 | (2006.01) |
| F02C 7/00 | (2006.01) |

(52) U.S. Cl.
CPC .............. *H02J 3/387* (2013.01); *F02C 7/00* (2013.01); *H01M 16/006* (2013.01); *H02J 3/005* (2013.01); *H02J 9/061* (2013.01); *H02J 11/00* (2013.01); *H01M 2250/10* (2013.01); *H01M 2250/402* (2013.01); *H02J 2001/004* (2013.01)

(58) Field of Classification Search
None
See application file for complete search history.

(56) References Cited

U.S. PATENT DOCUMENTS

| | | | |
|---|---|---|---|
| 6,288,456 B1 | 9/2001 | Cratty | |
| 7,476,987 B2 * | 1/2009 | Chang | H02J 3/28 290/55 |
| 9,819,192 B2 * | 11/2017 | Teichmann | H02J 4/00 |
| 2002/0014802 A1 | 2/2002 | Cratty | |

(Continued)

FOREIGN PATENT DOCUMENTS

| | | |
|---|---|---|
| EP | 2980948 | 2/2016 |
| JP | H02-086926 | 3/1990 |

(Continued)

*Primary Examiner* — Jared Fureman
*Assistant Examiner* — James P Evans
(74) *Attorney, Agent, or Firm* — Dentons US LLP

(57) ABSTRACT

In accordance with some embodiments, the present disclosure is directed to systems having a fuel cell and a turbine generator, each capable of providing electrical power to a utility grid, and methods for operating the same. The system may have a main AC bus which is coupleable to the utility grid. The fuel cell may be coupled to main AC bus through an inverter. The turbine generator may be coupled to the main AC bus through a series of inverters, one of which may include the inverter by which the fuel cell is connected to the main AC bus. One or more load banks may be provided to provide a load for electrical power generated from the fuel cell, turbine generator, or both in case the system is disconnected from the utility grid. Further support and backup systems may be provided.

5 Claims, 18 Drawing Sheets

(56) References Cited

U.S. PATENT DOCUMENTS

| | | | | |
|---|---|---|---|---|
| 2005/0006957 A1* | 1/2005 | Bronicki | ............... | F01K 13/00 |
| | | | | 307/43 |
| 2008/0217998 A1* | 9/2008 | Parmley | ................ | H02J 1/10 |
| | | | | 307/65 |
| 2009/0134624 A1* | 5/2009 | Kerber | ................ | F03D 7/00 |
| | | | | 290/44 |
| 2010/0047630 A1* | 2/2010 | Imanishi | ............ | H01M 8/04268 |
| | | | | 429/437 |
| 2011/0156480 A1* | 6/2011 | Park | ................ | G06F 1/30 |
| | | | | 307/23 |
| 2014/0242483 A1 | 8/2014 | Bozzolo et al. | | |
| 2014/0265585 A1* | 9/2014 | Della Sera | ............ | H02J 3/38 |
| | | | | 307/52 |
| 2016/0036236 A1* | 2/2016 | Teichmann | ............ | H02J 4/00 |
| | | | | 307/25 |
| 2018/0375133 A1* | 12/2018 | Berntsen | ................ | H02J 1/14 |

FOREIGN PATENT DOCUMENTS

| | | |
|---|---|---|
| JP | H06-168730 | 6/1994 |
| JP | H11-46460 | 2/1999 |
| JP | 2002-516557 | 6/2002 |
| JP | 2003-535563 | 11/2003 |
| JP | 2004-357390 | 12/2004 |
| JP | 2005-203145 | 7/2005 |
| WO | 0193410 | 12/2001 |

* cited by examiner

DC COUPLED POWER ELECTRONICS SYSTEM FOR A FUEL CELL POWER SYSTEM

This application is being contemporaneously filed with U.S. patent application Ser. No. 15/604,407, filed May 24, 2017, titled AC Coupled Power Electronics Systems for a Fuel Cell Power System, the entirety of which is incorporated herein by reference.

FIELD OF THE DISCLOSURE

This disclosure is related to power electronic control systems in fuel cell power plants. These fuel cell power plants may have both a fuel cell and a turbine generator capable of providing power to an electric power distribution system.

BACKGROUND

A fuel cell system may be used to generate electric power for a variety of applications. Examples of these applications may include small household appliances to large industrial power plants that provide electric power to national power grids.

Fuel cell systems also vary in design and function. While all fuel cells generate electricity in an electro-chemical reaction that combines a fuel source and an oxidant source to release electrons, a particular system or method which provides the fuel and oxidant to the fuel cell electrodes and how the fuel and oxidant are combined may be quite different than another system. One such fuel cell system may utilize the compressor of a turbo-generator to pressure an oxidant (e.g., air), thereby creating a differential pressure between oxidant inlet and exhaust to force the oxidant to flow through a fuel cell system. Oxidant and fuel unused in the fuel cell electro-chemical reaction may be combined and burned to provide a high temperature and pressure fluid that may be expanded through a turbine. The energy extracted by the turbine may be used to power (rotate) the compressor. Turbine generated energy in excess of that required by the compressor may be used to power an electric generator. The electric power from this generator may be combined with the electric output of the fuel cell system. Additionally, the generator may be configured to operate as a motor that draws electric power to rotate the turbine and compressor of the turbo-generator.

The fuel cell, turbo-generator system described above may be useful in large scale fuel cell power plants that may provide power to a national power grid or other large scale electric power distribution system. A challenge for large scale electric power distribution systems is caused by the interaction of other power plants, power distribution equipment and power loads, all of which may affect the operating conditions of the electric power distribution system. If the operating conditions of the electric power distribution system are outside of safe operating limits for a fuel cell power plant tied thereto, the fuel cell power plant may need to be rapidly isolated from the electric power distribution system to prevent damage to the fuel cell power plant. However, the fuel cell electro-chemical reactions cannot be stopped as quickly as the fuel cell power plant can be disconnected from the electric power distribution system, thereby presenting a risk of internal damage to the fuel cell from the excess energy generated therein. Additionally, a fuel cell system may need to be cooled in a precise and controlled manner when shutting down (or heated when starting up) to prevent damage resulting from, e.g., uncontrolled oxidation of the fuel cell anodes. One method to control the cool-down rate of a fuel cell system may be to control the flow of the oxidant through the fuel cell. In a fuel cell power plant such as that as described above, these factors are complicated by the mechanical and electric interaction between the fuel cell system and the turbo-generator.

There remains a need for improved systems and methods that address the forgoing difficulties.

The present application discloses one or more of the features recited in the appended claims and/or the following features which, alone or in any combination, may comprise patentable subject matter.

In accordance with some embodiments of the present disclosure, an electric system is provided. The electric system may comprise a main AC bus, a transformer, switch gear, a fuel cell, a load bank, a turbine generator, a backup generator, an uninterruptible power supply (UPS) and a control system. The main AC bus may be electrically coupleable to an electrical power distribution system (EPDS) by the transformer and switch gear. The fuel cell may have a DC output bus that may be electrically coupled to the main AC bus by a fuel cell inverter. The load bank may be electrically coupled to the main AC bus. The turbine generator may have an AC output bus that is electrically coupled to the fuel cell DC output bus by a machine inverter. The backup generator may have an AC output bus electrically coupled to the main AC bus. The UPS may be electrically coupled to the main AC bus, and the control system electrically coupled to the UPS.

In accordance with some embodiments of the present disclosure, a method of operating a power plant having a fuel cell system and a turbine generator, each capable of providing power to an EPDS, is provided. If the power plant is connected to the EPDS, the method may comprises operating the fuel cell in a power generating mode to provide power to the EPDS, operating the turbine generator in a power generating mode to provide power to the EPDS or operating the turbine generator in a motoring mode wherein the generator draws power a fuel cell DC output bus, and operating a control system of the power plant by drawing power from a main AC bus of the power plant. If the power plant is disconnected from the EPDS, the fuel cell may be operated in power generating mode to provide power to the main AC bus and to the turbine generator if the turbine generator is operating in a motoring mode, the turbine generator may be operated in a power generating mode providing power to the main AC bus, the control system may be operated by drawing power from the main AC bus, and a load bank may draw power from the main AC bus.

In accordance with some embodiments of the present disclosure, a method of operating a power plant having a fuel cell and a turbine generator each capable of providing power to an EPDS is provided. If the fuel cell is not providing power to the EPDS and the power plant is connected to the EPDS, the turbine generator may be operated in a power generating mode to provide power to the EPDS or operated in a motoring mode wherein the turbine generator draws power from the EPDS, and the power plant control system may draw power from the main AC bus. If the fuel cell is not providing power and the power plant is disconnected from the EPDS, the turbine generator may be operated in a power generating mode and provide power to the main AC bus or operated in a motoring mode wherein the turbine generator draws power from the main AC bus, the backup generator may be operated to provide power to the main AC bus, the control system may be operated by drawing power from the main AC bus, and a load bank may be provided to draw power from the main AC bus if the turbine generator is operating in a power generating mode.

In accordance with some embodiments of the present disclosure, an electric system is provided. The system may comprise a main AC bus, a fuel cell having a DC output bus, a fuel cell inverter, a fuel cell load bank, a turbine generator having an AC output bus, a machine inverter, a grid inverter, a turbine generator load bank, a backup generator having an AC output bus, an UPS, and a control system. The main AC bus may be connectable to a utility grid by a transformer and switch gear. The fuel cell DC output bus may be connected to the main AC bus by the fuel cell inverter. The fuel cell load bank may be connected to the main AC bus. The turbine generator AC output bus may be connected to the main AC bus by a machine inverter and a grid inverter. The backup generator ac output bus may be connected to the main AC bus. The UPS may be connected to the main AC bus and may be configured to provide power to the control system. The system may further include a turbine generator load bank.

In accordance with some embodiments of the present disclosure, a method of operating a power plant having a fuel cell and a turbine generator, each capable of providing power to a utility grid, is provided. If the power plant is connected to the utility grid, the method may comprise operating the fuel cell in a power generating mode to provide power to the utility grid, operating the turbine generating in a power generating mode to provide power to the utility grid or operating the turbine generator in a motoring mode wherein the turbine generator draws power from the main AC bus, and operating a control system of the power plant by drawing power from the main AC bus. If the power plant is disconnected from the utility grid, the method may comprise operating the fuel cell in a power generating mode to provide power to the main AC bus, operating the turbine generator in a power generating mode to provide power to a turbine generator load bank, or operating the turbine generator in a motoring mode wherein power is drawn from the fuel cell, providing a turbine generator load bank that may draw power form the turbine generator, operating the control system by drawing power from the fuel cell, and providing a fuel cell load bank to draw power from the main AC bus.

In accordance with some embodiments of the present disclosure, a method of operating a power plant having a fuel cell and a turbine generator, each capable of providing power to utility grid, is provided. If the fuel cell is not providing power and the power plant is connected to the utility grid, the method may comprise operating the turbine generator in a power generating mode to provide power to the utility grid or operating the turbine generator in a motoring mode wherein the turbine generator draws power form the utility grid, and operating a control system of the power plant, wherein the control system draws power from the utility grid. If the fuel cell is not generating power and the power plant becomes disconnected from the utility grid, the method may comprise operating the turbine generator in a power generating mode to provide power to a turbine generator load bank, or operating the turbine generator in a motoring mode, wherein the turbine generator draws power from the backup generator, providing a turbine generator load bank to draw power from the turbine generator if it is oepratin in a power generating mode, operating the backup generator to provide power to the turbine generator if it is operating in a motoring mode, the backup generator also providing power to the control system, and operating the control system, the control system drawing power from the backup generator.

These and many other advantages of the present subject matter will be readily apparent to one skilled in the art to which the disclosure pertains from a perusal of the claims, the appended drawings, and the following detailed description of preferred embodiments.

Figure 1:
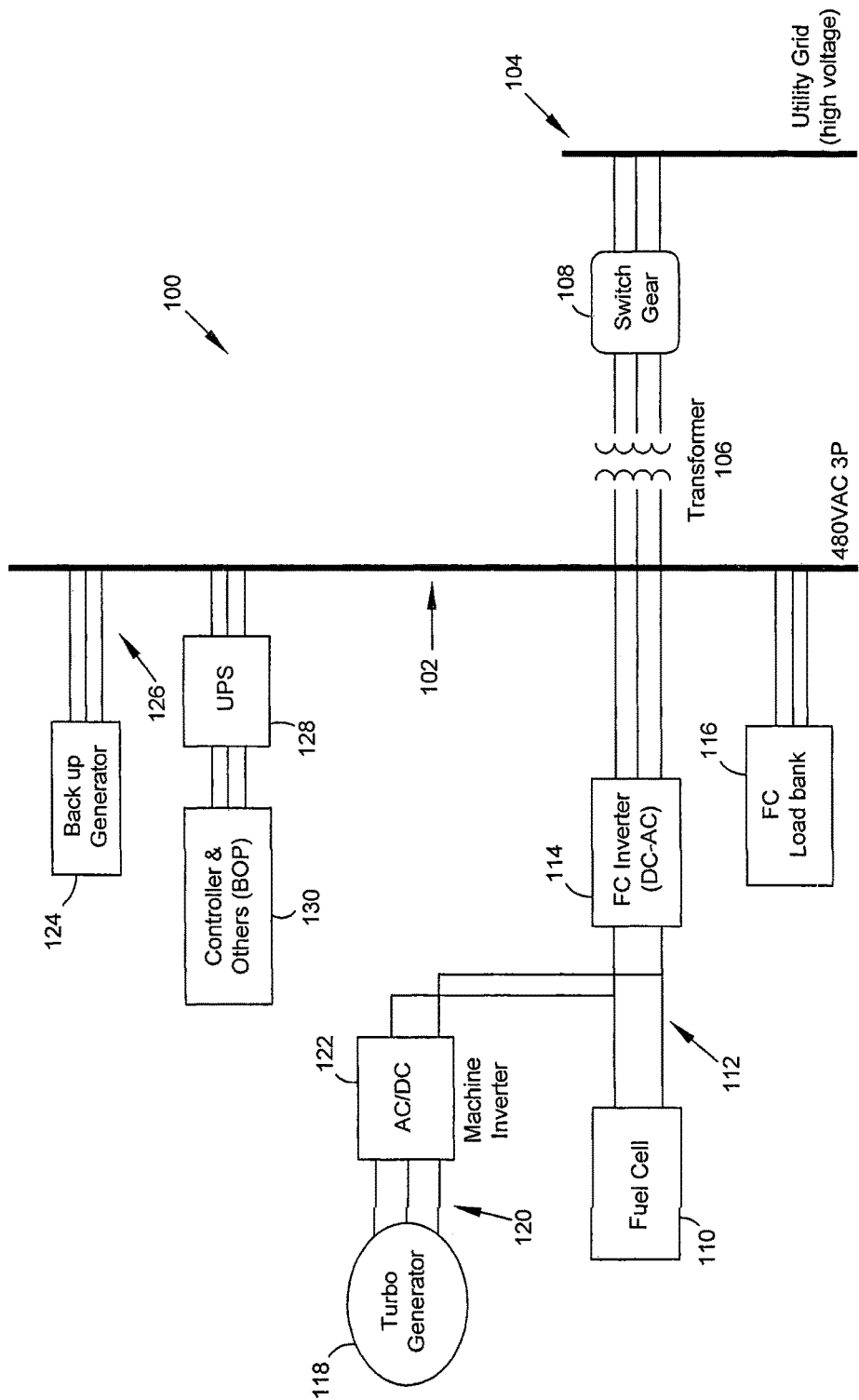
FIG. 1 is a schematic diagram of an electric system in accordance with some embodiments of the present disclosure.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of embodiments illustrated in the drawings and specific language will be used to describe the same.

In accordance with some embodiments of the present disclosure, an electric system 100 is illustrated in FIG. 1. The electric system 100 may comprise a main AC bus 102, and electric power distribution system (EPDS) 104, transformer 106, switch gear 108, a fuel cell 110, DC output bus 112, inverter 114, load bank 116, turbine generator 118, AC output bus 120, inverter 122, backup generator 124, AC output bus 126, uninterruptible power supply (UPS) 128 and control system 130.

The main AC bus 102 may be electrically coupleable to the EPDS 104 by transformer 106 and switch gear 108. In some embodiments additional components, e.g., breakers and disconnects, may be electrically coupled between the main AC bus 102 and the EPDS 104. These additional components may provide further coupling and protective functions for the main AC bus 102, components electrically coupled thereto, or both. The main AC bus 102, and equipment attached thereto, may be configured to support three-phase AC electric power.

The electric power distribution system (EPDS) 104 may be a national or regional electric grid. In some embodiments, the EPDS 104 may be any system in which multiple electric power generators, power transferring equipment, electric loads, or any combination of the foregoing are electrically coupled.

The transformer 106 may transform electric current from one voltage into another. In some embodiments, the transformer 106 may transform a three phase AC voltage of the main AC bus 102 into a different three phase AC voltage of the EPDS 104. Additionally, transformer 106 may isolate the voltage of the main AC bus 102 from the voltage of the EPDS 104. Transformer 106, while shown a single component, may comprise multiple transformers, other components, or both that are capable of providing the functions of transformer 106. Additionally, while transformer 106 is shown as being located between the main AC bus 102 and switch gear 108, it should be recognized that the locations of transformer 106 and switch gear 108 relative to one another and the main AC bus 102 and EPDS 104 may be altered.

Switch gear 108 may be capable of disconnecting (or uncoupling) the electric system of the fuel cell power plant from the EPDS 104, e.g., in the event of an abnormal grid condition. Conversely, switch gear 108 may be capable of connecting (or coupling) the electric system of the fuel cell power plant to the EPDS 104, e.g., during normal grid conditions. When the switch gear 108 electrically disconnects the fuel cell power plant from the EPDS, switch gear 108 may be described as being in an open position; when switch gear 108 electrically connects the fuel cell power plant to EPDS 104 the switch may be described as being a closed positon.

While switch gear 108 is characterized as a switch, a person of ordinary skill will understand that switch gear 108 may comprise any component, or number of components that may function to electrically connect and disconnect the fuel cell power plant from the EPDS 104.

Fuel cell 110 may be any particular type of a fuel cell. In some embodiments, the fuel cell 110 may be a solid oxide fuel cell. Fuel cell 110 may comprise a plurality of fuel cells each comprising an anode, a cathode and an electrolyte. The fuel (e.g., methane, natural gas, $H_2$, CO, etc.) may be combined with the oxidant (e.g., oxygen extracted from or forming a part of the ambient air) at the anode to release electrons and form reaction products that may include water. These electrons may travel to the cathode through one or more interconnects where the electrons ionize the oxidant. The ionized oxidant may then travel through the solid oxide electrolyte, which may be impervious to the fluid fuel and oxidant. A plurality of fuel cells may be arranged in various series, parallel, or both combinations to generate a resultant system voltage, current, and power. In some embodiments, fuel cell 110 may further comprise a voltage regulator converter (e.g., DC converter), such as that described in U.S. patent application Ser. No. 14/914,982, the disclosure of which is herein incorporated by reference, that improves the management of output of the plurality of fuel cells from which fuel cell 110 may be comprised. This generated electric power may eventually be supplied to the EPDS 104.

DC output bus 112 provides the electric coupling between the fuel cell 110 and the inverter 114. Additionally, DC output bus 112 provides for electric coupling with inverter 122. While DC output bus 112 is shown in FIG. 1 as mere electric connections, a person of ordinary skill will understand that FIG. 1 is a simplified diagram. In addition to providing the aforementioned connections, DC output bus 112 may comprise one or more breakers, switches, instrumentation or connections for instrumentation, or any other component for proper, safe and efficient operation.

Inverter 114 provides the electric connection (coupling and decoupling) and conversion of AC to DC or DC to AC between the DC output bus 112 and the main AC bus 102. DC power provided to inverter 114 may be converted into AC power by inverter 114. When the fuel cell power plant is electrically connected to the EPDS 104 (aka "grid dependent mode"), the inverter 114 may synchronize the AC voltage and phase(s) of the converted DC power (from the DC output bus 112) to the EPDS 104 voltage and phase(s) (the main AC bus 102 voltage and phase(s) may be configured to match the EPDS 104 voltage and phase(s)) while controlling the AC current, AC real power, reactive power or both, or any combination of the foregoing resulting from the conversion of the DC electric power from DC output bus 112. When the fuel cell power plant is electrically disconnected from the EPDS 104 (aka "grid independent mode"), the inverter 114 may independently control the AC output voltage and phase(s) from the conversion of the electric power from the DC output bus 112 separately from or in addition above mentioned characteristics. Additionally, inverter 114 may have protective functions such a current limit (maximum, maximum long duration, maximum short duration), DC link voltage limit (which may be in the range of ~500-800 V DC, and in some embodiments ~100-2500 V DC), frequency variation limit, etc.

While inverter 114 is illustrated in FIG. 1 as a single component, one of ordinary skill will understand that FIG. 1 is a simplified diagram. Inverter 114 may comprise a plurality of electric components configured as required to perform the functions of inverter 114 as described above.

Load bank 116 may be coupled to may be electrically connected (coupled) to the main AC bus 102. Load bank 116 may function to consume excess electric power in the event that the fuel cell power plant must be rapidly disconnected from the EPDS 104. In some instances, the fuel cell power plant must be decoupled from the EPDS 104 in a manner faster than the fuel cell 110, turbine generator 118, or both can be shut down or reduce electric power output. With the fuel cell 110, turbine generator 118, or both still generating electric power, that power must be consumed because the electric loads provided through the EPDS 104 are no longer coupled to the fuel cell power plant. This excess power is consumed by load bank 116.

Load bank 116 may be a flywheel bank, capacitor bank, resistor bank, battery bank, or a combination of the foregoing or any other electric load capable of consuming the excess power generated by the fuel cell power plant. One advantage of using a flywheel bank, capacitor bank, battery bank or combination thereof may be the mechanical, electric, or chemical storage of excess electric energy that may be recouped when the fuel cell power plant is recoupled to the EPDS 104 or used to power loads of the fuel cell power plant (e.g., motoring turbine generator 118 or powering control system 130).

In some embodiments, load bank 116 may be directly coupled to the DC output bus 112.

Turbine generator 118 may be similar to the turbo-generator described above. For example, the turbine generator 118 may comprise a compressor, turbine and generator connected in a suitable arrangement via shafts. The compressor may draw in and pressure an oxidant from the ambient air or other source to drive the air and fluid flows within the fuel cell 110 and associated systems. The pressurized oxidant may then flow through oxidant inlet and exhaust piping to provide oxidant to and remove oxidant from the fuel cell 110. In some embodiments, the compressor may be configured to pressurize other fluid sources, e.g., reducing or inerting gases, for using in fuel cell 110, other supporting systems, or both. The oxidant exhausted from the fuel cell 110 may be combined with the unused fuel from fuel cell 110, or other fuel source, and combusted to provide a heated exhaust fluid. In some embodiments, the amount of combusted exhausted oxidant and unused fuel may be controlled to achieve a fluid flow having the necessary characteristics to provide the desired energy when extracted through the turbine. In some embodiments, little or no exhausted oxidant and unused fuel may be combusted, rather, the exhausted fluid flow may be sufficient to drive the turbine for the desired work output (e.g., to drive the combustor, provide electrical power, or both). This heated exhaust fluid may be used to provide recuperating or other heat exchange functions with fuel, oxidant or both prior to entering the fuel cell 110. The heated exhaust fluid may also be expanded through the turbine of turbine generator 118 to provide the shaft work to rotate the compressor. The turbine may be mechanically coupled to a generator to produce electric power. The turbine generator 118 may be operating in a "generating mode" when the rotational energy of the turbine and generator of turbine generator 118 is converted into electric power by the generator.

In some embodiments, the generator of turbine generator 118 may be configured to operate as a motor-generator such that an external source of electric power may be applied to the generator. The applied electric power may be converted into rotational energy of the generator, and therefore the turbine generator 118 as well. This mode of turbine generator 118 operation may be referred to as a "motoring mode." In the motoring mode, the rotation of the turbine generator 118 transferred to the compressor of turbine generator 118 to pressure the oxidant, or other fluid source, for use by the fuel cell 110. In some embodiments, the turbine of turbine generator 118 may be decoupled from the generator, compressor, or both in order to reduce the amount of energy needed to rotate the compressor in the motoring mode.

AC output bus 120 may electrically connectable (coupleable) to turbine generator 118. AC output bus 120 provides a structure, e.g., wires, cabling, bus bars or a combination thereof, that provide the electric connection between the turbine generator 118 and the inverter 122. While AC output bus 120 is shown in FIG. 1 as mere electric connections, a person of ordinary skill will understand that FIG. 1 is a simplified diagram. In addition to providing the aforementioned connections, AC output bus 120 may comprise one or more breakers, switches, instrumentation or connections for instrumentation, or any other component for proper, safe and efficient operation.

Inverter 122 may provide electric coupling and electric conversion between the AC output bus 120 and the DC output bus 112. For example, when the turbine generator 118 is generating and providing electric power to the AC output bus 120, inverter 122 may convert this AC electric power into DC electric power for application to the DC output bus 112. This conversion may require controlling the converted DC voltage. When the turbine generator 118 is operating in a motoring mode, the inverter 122 may convert DC electric power from the DC output bus 112 and convert it to and supply AC power to the AC output bus 120.

Inverter 122 may also be used to control the speed of or torque placed on the turbine generator 118. Controlling the speed of the turbine of generator 118 may also, regardless of operating mode of the turbine generator 118, control, directly or indirectly, the speed of compressor. As described above, the compressor provides oxidant, or other fluid, that is used for the electro-chemical reaction of fuel cell 110 and as a means to control the temperature and rate-of-change of temperature of the fuel cell 110 (e.g., heat-up or cool-down) as well as other functions related to the fuel cell 110 or its support systems. The mechanical and electric interoperation of the fuel cell 110 and turbine generator 118, and the electric coupling of fuel cell power plant and the EPDS 104 can be managed by an electric system comprising one or more of the components disclosed in FIG. 1.

The backup generator 124 may be, e.g., a diesel, gasoline, natural gas, or other generator. In some embodiments, the backup generator 124 may be wind powered generator or solar generator. As will be appreciated by those of skill in the art, the particular type of component that comprises backup generator 124 may be any type suitable for power generation may be any type of suitable power generation, conversion, or storage device which is capable of meeting the system design limitations of ready availability in case of a grid-fault event and of sufficient capacity to power the control system 130 and motor turbine generator 118 during fuel cell cool down and other system design criteria. It should be understood that backup generator 124 may comprise multiple components of varying types to meet the aforementioned system design criteria.

Backup generator 124 may provide supplementary power to the fuel cell power plant in case of abnormal operating conditions. For example, if the fuel cell power plant is not coupled to the EPDS 104, the backup generator may provide a source of electric power. In some embodiments, the fuel cell 110 may not be generating electric power while the turbine generator 118 is generating electric power. The backup generator 124 may be used in such a situation to provide a steady source of electric power to the power plant control system 130. While the turbine generator 118 may be able to provide some power to the control system 130, the availability and amount of the power generated by turbine generator 118 may vary. Turbine generator 118 may also be required to provide energy to rotate the compressor in a controlled manner in order to provide for the safe cool-down (or heat-up or other operation) of the fuel cell 110. In addition to supplying steady electric power for control system 130, the electric power generated by the backup generator 124 may provide electric power to inverter 122 in order power turbine generator 118 when operated in a motoring mode.

In some embodiments, the backup generator 124 may not be providing power to the AC output bus 126. However, this does not mean that the backup generator may not be operating in some fashion. For example, the backup generator 124 may be operated for warm-up or cool-down operations, maintenance, or other operations in which no AC power is provided from the backup generator 124 to the AC output bus 126. In some embodiments, the backup generator 124 may provide power to the AC output bus 126 that is electrically decoupled from the main AC bus 102.

AC output bus 126 may couple backup generator 124 to the main AC bus 102. As described above for AC output bus 120 and DC output bus 112, FIG. 1 illustrates a simplified diagram of electric system 100. AC output bus 126 may comprise additional components providing additional functionality.

Uninterruptible power supply (UPS) 128 is provided to electrically couple control system 130 to the main AC bus 102. Additionally, UPS 128 provides for the storage of electric energy to be used during the interruption of power from other sources, e.g., a failure of the EPDS 104, fuel cell 110, turbine generator 118, backup generator 124, or any combination of the foregoing. UPS 128 may further provide continuous power to the control system 130 during transitions of electric power sources or at any time that the electric power from other sources is unavailable. UPS 128 may also condition (e.g., control the voltage, phase(s), etc.) the power drawn by the control system 130. UPS 128 may be a battery, chemical, electric or mechanical, or other component configured to provide the above described functionality.

UPS 128 may draw power from the main AC bus 102. The power on the main AC bus may be provided by EPDS 104, fuel cell 110, turbine generator 118, backup generator 124, load bank 116, or a combination of these or other components.

Control system 130 (which may also be referred to as a "balance of plant") may be configured to control, monitor and communicate with each component in electric system 100 for safe operation of the system. In addition, control system 130 may provide power to various components in the system 100, including other components not shown in FIG. 1. For example, control system 130 may control the operation of valves, heaters, pumps, remotely operated breakers and switches, lights, instrumentation (temperature, pressure, flow, etc.), locks, automatic or manual remote protection systems and other components that may enhance the safe or efficient operation of the fuel cell power plant. Control system 130 may be configured to control the operation of the above listed and other components for a plurality of subsystems used to support the operations of electric system 100.

Figure 2:
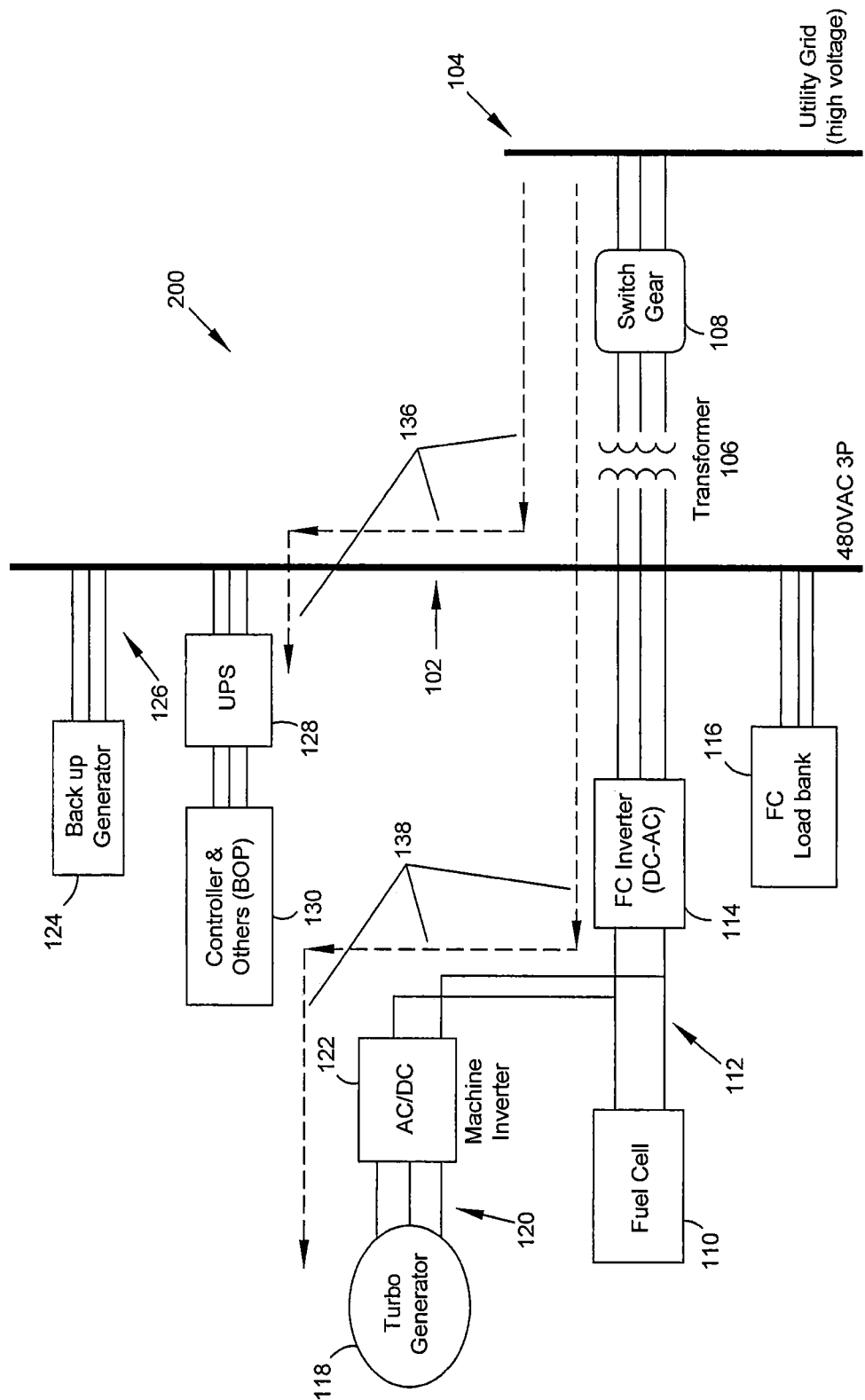
FIG. 2 is a schematic diagram of an electric system coupled to an electric power distribution system in accordance with some embodiments of the present disclosure.

In accordance with some embodiments of present disclosure an electric system 200 is illustrated in FIG. 2. The electric system 200 may comprise a main AC bus 102, and electric power distribution system (EPDS) 104, transformer 106, switch 108, fuel cell 110, DC output bus 112, inverter 114, load bank 116, turbine generator 118, AC output bus 120, inverter 122, backup generator 124, AC output bus 126, uninterruptible power supply (UPS) 128 and control system 130, which may be similar to the main AC bus 102, and electric power distribution system (EPDS) 104, transformer 106, switch gear 108, fuel cell 110, DC output bus 112, inverter 114, load bank 116, turbine generator 118, AC output bus 120, inverter 122, backup generator 124, AC output bus 126, uninterruptible power supply (UPS) 128 and control system 130 as described above.

As shown in FIG. 2, the main AC bus 102 may be electrically coupled to the EPDS 104. This electric coupling may be achieved by switch gear 108 being in a closed position. The EPDS 104 may provide electric power to main AC bus 102 and to components electrically coupled, directly or indirectly, thereto. Fuel cell 110 may not be generating electric power, providing electric power to the DC output bus 112, or both. Turbine generator 118 may be operating in a "motoring mode" wherein the generator acts as a motor such that turbine generator 118 converts electric energy into the rotational energy of the turbine and compressor of turbine generator 118. In the motoring mode, turbine generator 118 may draw power form the DC output bus 112. In some embodiments, the turbine of turbine generator 118 may be disconnected from the generator by, e.g., a clutch, such that the only the compressor is rotated, thereby saving energy. The compressor of turbine generator 118 may be rotated to pressure oxidant, or other fluid for use by the fuel cell 110 for the electro-chemical reaction therein, for heat-up or cool-down operations, or for some other fuel cell system operation or support system operation. The backup generator 124 may not be providing power to the AC output bus 126. The backup generator 124 may be operating for some other operation or reason. In some embodiments, the backup generator 124 may provide power to the AC output 126 that is not electrically coupled to the main AC bus 102. In either embodiment, any power generated by the backup generator 124 is not available to drive the motoring of turbine generator 118 nor to provide the power to control system 130 or to recharge the UPS 128. UPS 128 may draw power from the main AC bus 102 and provide power to the control system 130. While there may be temporary imbalances between the power drawn by UPS 128 and control system 130, the average of these drawn powers will be such that UPS 128 is able to recharge and maintain a full state of readiness.

Arrows 136 and 138 show the flow of electric power from the EPDS 104 to the control system 130 and the turbine generator 118, respectively. Electric power from the EPDS 104 flows through switch gear 108 and transformer 106 to the main AC bus 102. From the main AC bus 102, power flows to the UPS 128 and to inverter 114. From UPS 128, electric power is provided to control system 130. From the inverter 114, power is converted into DC and supplied to the DC output bus 112. Electric power from the DC output bus 112 is then converted into AC power by inverter 122. The converted AC power may be used to drive a permanent magnetic synchronous motor of the turbine generator 118 at high speed. In this conversion, the AC current, voltage, and phase(s) may be controlled to achieve the desired rotational rate of the compressor of turbine generator 118, thereby controlling the pressurization and flow of oxidant (or other fluid) for the fuel cell 110. In some embodiments, the fuel cell 110 may also draw DC current from DC output bus 112.

While arrows are shown and described in FIG. 2 above, and in many figures below, these arrows represent possible electrical flows and direction of those flows, but may not indicate every possible electrical flow nor, necessarily, the capability for simultaneously flow. Rather, as one of ordinary skill in the art will appreciate, the particular flow of electrical power between components is driven by the electrical parameters of those components relative to one another. For example, while FIG. 3 (described below) may show a power flow from the EPDS 104 to the UPS 128, and a power flow from the Fuel Cell 110 to the EPDS 104, a person of ordinary skill will recognize that the fuel cell 110 may provide power to UPS 128 as well, and that the flow to and from the EPDS and the main AC bus 102 may not occur simultaneously. Again, these illustrated flows represent some of the possible electrical flow paths and directions which many not occur at the same time.

Figure 3:
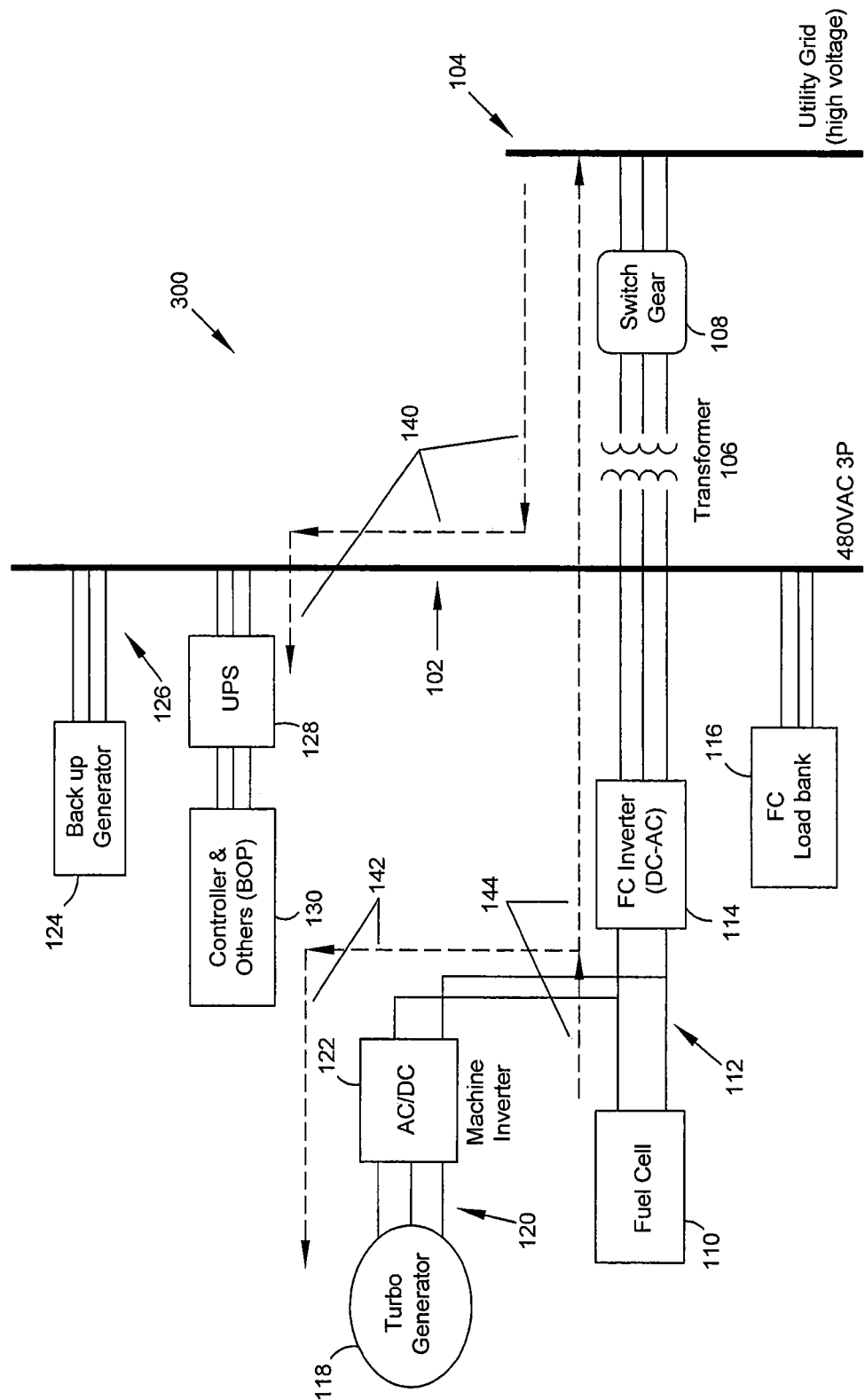
FIG. 3 is a schematic diagram of an electric system coupled to an electric power distribution system and a fuel cell providing electric power to the electric power distribution system in accordance with some embodiments of the present disclosure.

In accordance with some embodiments of present disclosure an electric system 300 is illustrated in FIG. 3. The electric system 300 may comprise a main AC bus 102, and electric power distribution system (EPDS) 104, transformer 106, switch 108, fuel cell 110, DC output bus 112, inverter 114, load bank 116, turbine generator 118, AC output bus 120, inverter 122, backup generator 124, AC output bus 126, uninterruptible power supply (UPS) 128 and control system 130, which may be similar to the main AC bus 102, and electric power distribution system (EPDS) 104, transformer 106, switch gear 108, fuel cell 110, DC output bus 112, inverter 114, load bank 116, turbine generator 118, AC output bus 120, inverter 122, backup generator 124, AC output bus 126, uninterruptible power supply (UPS) 128 and control system 130 as described above.

As shown in FIG. 3, the main AC bus 102 may be electrically coupled to the EPDS 104. The EPDS 104 may provide electric power to main AC bus 102 and to components electrically coupled, directly or indirectly, thereto. The fuel cell 110 may be generating DC power and providing DC power to the DC output bus 112. The turbine generator 118 may be drawing power from the DC output bus 112. The backup generator 124 may not be providing AC power to the AC output bus 126. The UPS 128 may be drawing power from the main AC bus 102.

The electric power generated by the fuel cell 110 may be provided to the DC output bus 112. As shown by arrows 144, the power may flow from the DC output bus 112 to inverter 114. Inverter 114 may convert the electric power from DC to AC power in order to match the voltage and phase(s) of the EPDS 104 which may be placed on the main AC bus 102. While the voltage and phase(s) of the converted AC power may be compatible with the AC power of the EPDS 104, the inverter 114 may also control the real and reactive power of the resultant converted AC power. The converted AC power may then flow to the main AC Bus 102 and to either the control system 130, the EPDS 104 or both. For power flowing to control system 130, this power passes through the UPS 128 prior to reaching control system 130. For power flowing to EPDS 104, this power passes through transformer 106 and switch gear 108 prior to reaching the EPDS 104.

Electric power from the EPDS 104 may also flow into the electric system 300. For example, in some embodiments, power from EPDS 104 may flow to control system 130 via UPS 128 and main AC bus 102. This flow of power is illustrated by arrows 140.

Electric power from the DC output bus 112 may also flow to the turbine generator 118 via inverter 122 as shown by arrow 142. Inverter 122 may convert the DC power on DC output bus 112 to the required voltage, current and phase(s) of AC output bus 120 to rotate the turbine, compressor and generator of turbine generator 118 at a desired speed. A permanent magnet synchronous motor of the generator may drive the turbine generator 118 at high speed such that the compressor of turbine generator 118 may continue to supply pressurized oxidant, or other fluid, for the fuel cell system.

Figure 4:
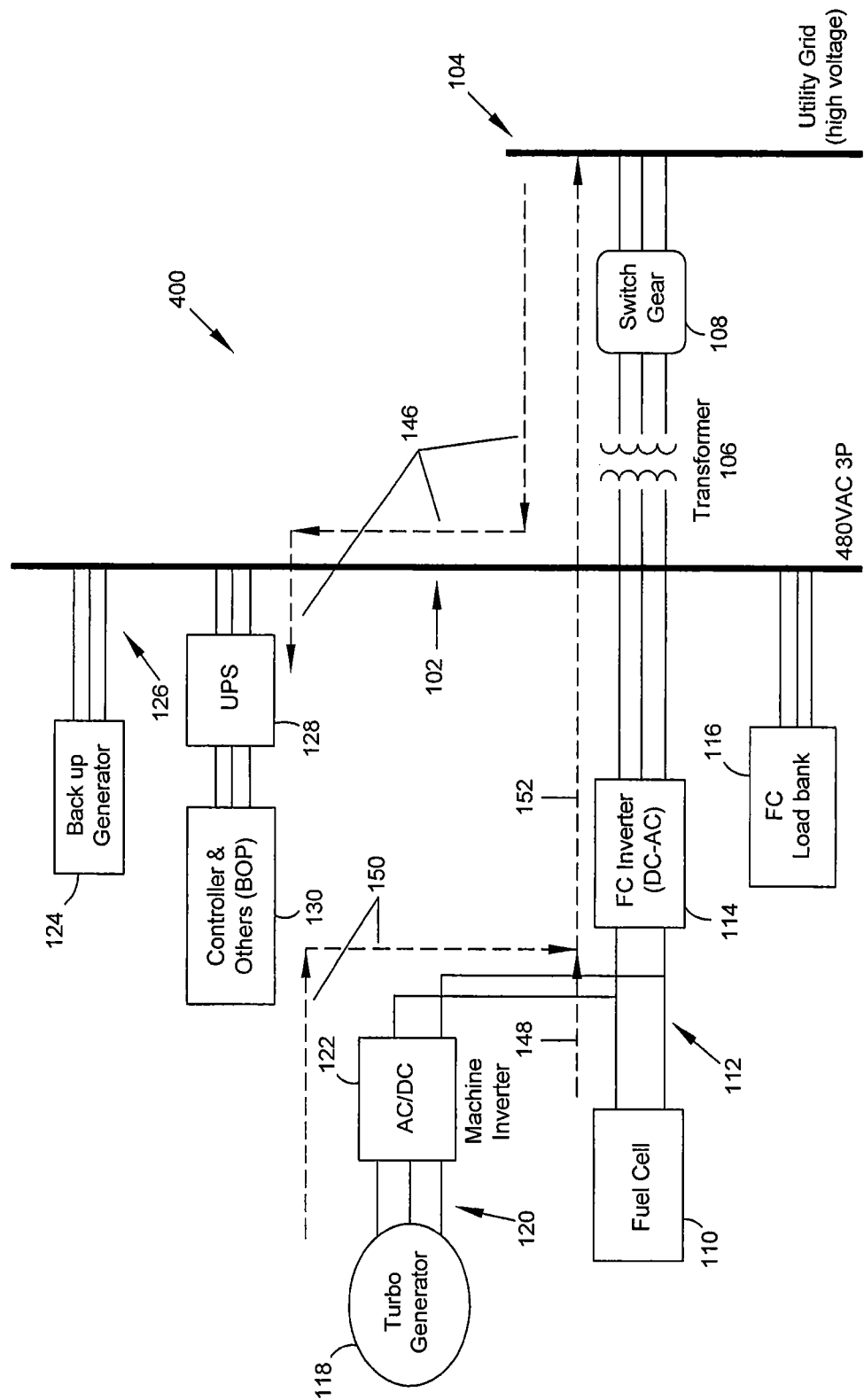
FIG. 4 is a schematic diagram of an electric system coupled to an electric power distribution system and a fuel cell and a turbine generator providing electric power to the electric power distribution system in accordance with some embodiments of the present disclosure.

In accordance with some embodiments of present disclosure an electric system 400 is illustrated in FIG. 4. The electric system 400 may comprise a main AC bus 102, and electric power distribution system (EPDS) 104, transformer 106, switch 108, fuel cell 110, DC output bus 112, inverter 114, load bank 116, turbine generator 118, AC output bus 120, inverter 122, backup generator 124, AC output bus 126, uninterruptible power supply (UPS) 128 and control system 130, which may be similar to the main AC bus 102, and electric power distribution system (EPDS) 104, transformer 106, switch gear 108, fuel cell 110, DC output bus 112, inverter 114, load bank 116, turbine generator 118, AC output bus 120, inverter 122, backup generator 124, AC output bus 126, uninterruptible power supply (UPS) 128 and control system 130 as described above.

As shown in FIG. 4, the main AC bus 102 may be electrically coupled to the EPDS 104, which may be effected by switch gear 108 being in a closed (or "ON") position. The EPDS 104 may provide electric power to main AC bus 102 and to components electrically coupled, directly or indirectly, thereto. When the main AC bus 102 is connected to the EPDS 104, AC electric power is able to flow between the main AC bus 102 and the EPDS 104 as shown by arrows 152 and 146. As shown in FIG. 4, this configuration will allow for the UPS to be supplied with electric power from the main AC bus 102 that may be generated by the turbine generator 118, fuel cell 110, backup generator 124, the EPDS 104, or some combination of the foregoing. In some embodiments, load bank 116 may be configured to supply electric power to the main AC bus 102 and components electrically coupled thereto.

Fuel Cell 110 may be generating electric power via the previously described fuel cell electro-chemical reaction and thereby provide DC power to the DC output bus 112 as shown by arrow 148. Turbine generator 118 may be generating electric power via the expansion of combusted fuel cell reaction products through a turbine and thereby provide AC power to the AC output bus 120. The backup generator 124 is not providing AC power to the AC output bus 126. The UPS 128 is drawing power from the main AC bus 102.

As described above, the AC power generated by the turbine generator 118 may be transferred from the AC output bus 120 to the DC output bus 112 via inverter 122. This flow of electric power is shown by Arrows 150. Inverter 122 will convert the turbine generator 118 generated AC power into the required DC power for the DC output bus 112. During this conversion, inverter 122 may control the DC voltage, current, or both that results from this conversion. The DC power on the DC output bus 112 may be the combined outputs of the fuel cell 110 and the turbine generator 118. This DC power may be transferred to the main AC bus 102 by inverter 114. This flow of electric power is shown by arrow 152. Inverter 114 may convert the DC power to an AC voltage and phase(s) that is compatible with the voltage and phase(s) on the main AC bus 102. The main AC bus 102 may be electrically coupled to the EPDS 104, and therefore, the voltage and phase(s) converted by inverter 114 may be compatible with the voltage and phase(s) of the EPDS 104. While conditioning this converted voltage to be compatible with those of EPDS 104, the inverter may control the real and reactive power from conversion of the outputs of the fuel cell 110 and turbine generator 118. The converted electric power may then be used to supply the EPDS 104 and loads attached therefore.

The backup generator 124 may not be providing power to the AC output bus 126. However, this does not mean that the backup generator may not be operating in some fashion. For example, the backup generator 124 may be operated for warm-up or cool-down operations, maintenance, or other operations in which no AC power is provided from the backup generator 124 to the AC output bus 126. In some embodiments, the backup generator 124 may provide power to the AC output bus 126 that is electrically decoupled from the main AC bus 102.

The UPS 128 may be electrically coupled to and draw electric power from the main AC bus 102. The electric power drawn by UPS 128 may originate from the turbine generator 118, the fuel cell 110, the EPDS 104, the backup generator 124 (if connected to and providing power to the main AC bus 102), or some combination of these sources.

In turn, control system 130 draws electric power from the UPS 128. To maintain the UPS 128 at full capacity, the average power drawn by the control system 130 may be less than the average power drawn by the UPS 128.

Figure 5:
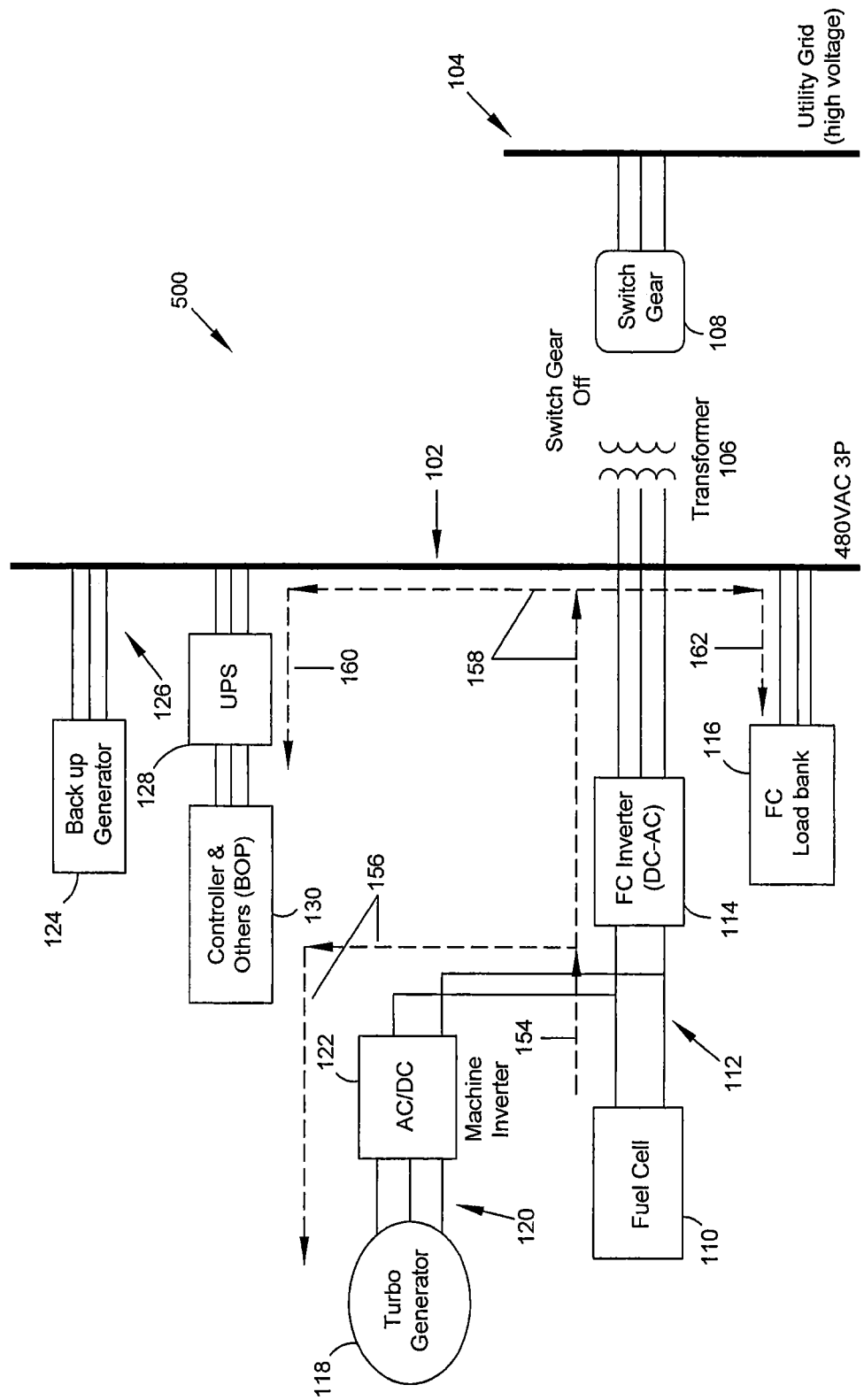
FIG. 5 is a schematic diagram of an electric system decoupled from an electric power distribution system and a fuel cell providing electric power to the electric system in accordance with some embodiments of the present disclosure.

In accordance with some embodiments of present disclosure an electric system 500 is illustrated in FIG. 5. The electric system 500 may comprise a main AC bus 102, and electric power distribution system (EPDS) 104, transformer 106, switch 108, fuel cell 110, DC output bus 112, inverter 114, load bank 116, turbine generator 118, AC output bus 120, inverter 122, backup generator 124, AC output bus 126, uninterruptible power supply (UPS) 128 and control system 130, which may be similar to the main AC bus 102, and electric power distribution system (EPDS) 104, transformer 106, switch gear 108, fuel cell 110, DC output bus 112, inverter 114, load bank 116, turbine generator 118, AC output bus 120, inverter 122, backup generator 124, AC output bus 126, uninterruptible power supply (UPS) 128 and control system 130 as described above.

As shown in FIG. 5, the main AC bus 102 may not be electrically coupled to the EPDS 104 because switch gear 108 may be in an open (or "OFF") position. The fuel cell 110 may be generating DC electric power and providing that generated power to the DC output bus 112. The load bank 116 may be drawing power from the main AC bus 102. Turbine generator 118 may be drawing power from the DC output bus 112. The backup generator may not be providing power to AC output bus 126. The UPS may be drawing power from main AC bus 102.

The main AC bus 102 may be disconnected from the EPDS 104 due to a fault or some other condition of EPDS 104 which may pose some threat to the fuel cell power plant, and therefore the fuel cell power plant may be disconnected from the EPDS 104 as a protective measure. In some embodiments, the fuel cell power plant may need to be rapidly disconnected from the EPDS 104 to ensure this protective measure is effective. In some embodiments, the fuel cell power plant may need to be disconnected from the EPDS 104 due to a fault or other condition associated with the fuel cell power plant that may present a safety hazard to the EPDS 104. Again, this hazard may be addressed by rapidly disconnecting the fuel cell power plant from the EPDS 104 by opening switch gear 108.

When switch gear 108 is opened in a rapid manner, the fuel cell 110 may be generating excessive electric power compared to that required to motor the turbine generator 118 and power control system 130. This excess electrical power can be expended by the fuel cell power plant, thereby avoiding the need to burn the fuel, supplied for the electro-chemical reaction in the fuel cell, elsewhere in the fuel cell system and thus generating unwanted heat. To consume this excess power, load bank 116 may be electrically coupled to and draw power from the main AC bus 102 of the fuel cell power plant. In some embodiments, the load bank 116 consumes an amount of power equal to the difference between the power generated by the fuel cell 110 and the power consumed by the motoring turbine generator 118, operating control system 130 and electric losses that may exist in the system 500.

In some embodiments, the electric power produced by fuel cell 110 may be lowered following an opening of switch gear 108 such that the amount of power consumed by the load bank 116 is reduced. The power output of fuel cell 110 may be lowered to a point such that the power produced by the fuel cell 110 is approximately the same as the power required to motor turbine generator 118 (to supply oxidant for the electro-chemical reactions of fuel cell 110, to provide oxidant or other fluid flow for heating-up or cooling down the fuel cell 110, or a combination of these or other operations) and power the control system 130.

In some embodiments, the load bank 116 may include the ability to store excess power generated by the fuel cell system 110 such that this power may be used as an additional source of backup power, may be utilized when the fuel cell power plant is reconnected to the EPDS 104, or both.

The resultant power flows are shown in FIG. 5. Arrow 154 shows the power that may be generated by the fuel cell 110 and supplied to the DC output bus 112. This power may be split between power sent to the turbine generator 118 and the main AC bus 102 as represented by arrows 156 and 158, respectively. Power sent to the turbine generator 118 may pass from the DC output bus 112 to the AC output bus 120 via inverter 122. Inverter 122 may convert the DC power on DC output bus 112 to AC power for the AC output bus 120. During this conversion, the inverter 122 may convert the DC power to the required AC voltage and phase(s) to cause turbine generator 118 to rotate at a speed sufficient to meet the airflow requirements of the fuel cell 110.

DC power may also be transferred from the DC output bus 112 to the main AC bus 102 via inverter 114. The inverter 114 may control the voltage, phase(s), and real and reactive power of the resultant converted AC power. The inverter 114 may be required to control the voltage and phase(s) of the converted power because the main AC bus 102 is no longer electrically coupled to the EPDS 104, and no other component may be controlling these electric properties of the power on the main AC bus 102. The AC electric power may flow on the main AC bus 102 to load bank 116 and UPS 128 as shown by arrows 162 and 160, respectively.

Figure 6:
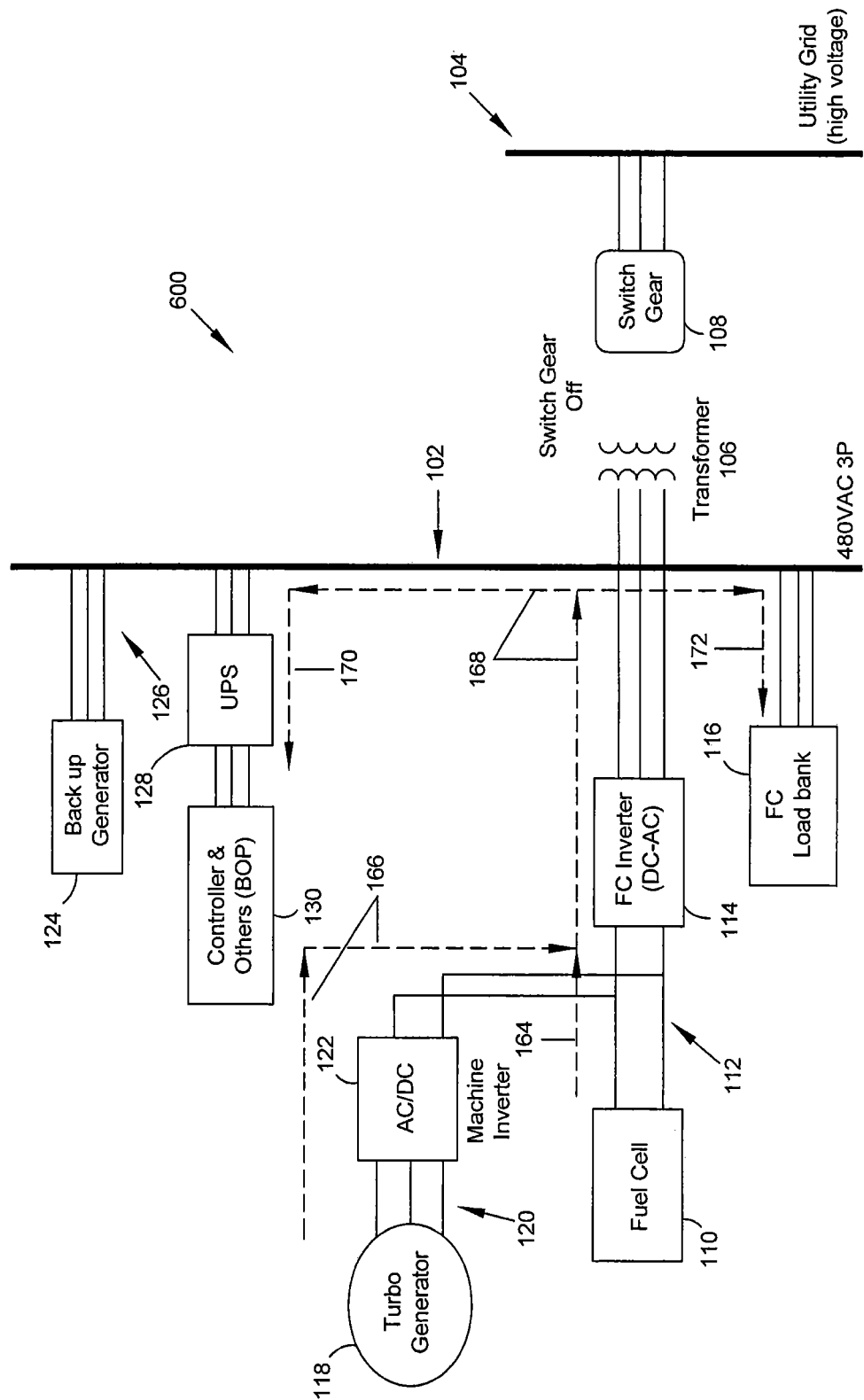
FIG. 6 is a schematic diagram of an electric system decoupled from an electric power distribution system and a fuel cell and a turbine generator providing electric power to the electric system in accordance with some embodiments of the present disclosure.

In accordance with some embodiments of present disclosure an electric system 600 is illustrated in FIG. 6. The electric system 600 may comprise a main AC bus 102, and electric power distribution system (EPDS) 104, transformer 106, switch 108, fuel cell 110, DC output bus 112, inverter 114, load bank 116, turbine generator 118, AC output bus 120, inverter 122, backup generator 124, AC output bus 126, uninterruptible power supply (UPS) 128 and control system 130, which may be similar to the main AC bus 102, and electric power distribution system (EPDS) 104, transformer 106, switch gear 108, fuel cell 110, DC output bus 112, inverter 114, load bank 116, turbine generator 118, AC output bus 120, inverter 122, backup generator 124, AC output bus 126, uninterruptible power supply (UPS) 128 and control system 130 as described above.

As shown in FIG. 6, the main AC bus 102 may be electrically decoupled from the EPDS 104. The fuel cell 110 may be generating electric power and providing that electric power to the DC output bus 112. The load bank 116 may be drawing power from the main AC bus 102. The turbine generator 118 may be generating electric power and providing that electric power the AC output bus 120. The backup generator 124 may not be generating electric power, providing electric power to the AC output bus 126, not providing electric power to the main AC bus 102, or a combination of the foregoing. The UPS 128 may be drawing power from the main AC bus 102.

Some of the flow of electric power shown in FIG. 6 may correspond to those flows in FIG. 5. For example, the electric power generated by fuel cell 110 may flow to the DC output bus 112 as shown by arrow 164, corresponding to the flow of arrow 154. This correspondence may be the general direction of power flow, the total electric power of the flow, or a combination of these characteristics. Similarly, arrow 168 may correspond to arrow 158, arrow 170 may correspond to arrow 160 and arrow 172 may correspond to arrow 162.

One difference between embodiments illustrated in FIG. 5 and FIG. 6 is that turbine generator 118 may be generating power which flows to the DC output bus 112 as indicated by arrow 166. This flow is converted from AC power on the AC output bus 120 to DC power for the DC output bus 112 by inverter 122. Inverter 122 may be configured to convert the AC power on the AC output bus 120 to a DC power of a particular voltage for use on the DC output bus 112. The particular conversion performed by inverter 122 may also control the torque placed on the turbine generator 118 to thereby help control the speed of the turbine generator 118, and therefore the amount of oxidant or other fluid flowing to fuel cell 110 due to the connection of the compressor to the turbine generator 118.

Another difference is that the total electric power provided to main AC bus 102 is a combination of the power generated by the fuel cell 110 and the turbine generator 118. Consequently, the power consumed by load bank 116 may be an amount equal to the difference between the power generated by the fuel cell 110 and turbine generator 118 and the power consumed by the UPS 128 and control system 130 plus any other losses in the system.

With the turbine generator 118 being powered by the expansion of combustion products through a turbine, the electric power produced by turbine generator 118 may be more than that needed to operate the fuel cell power plant. Given the above described interrelated mechanical (e.g., turbine generator 118 supplying fuel cell 110 with air) and electric (e.g., combined power outputs of the turbine generator 118 and fuel cell 110) operations of the turbine generator 118 and fuel cell 110, the load bank 116 may be required to consume a portion of the power generated by both the turbine generator 118 and fuel cell 110 such that these components can safely interoperate.

Figure 7:
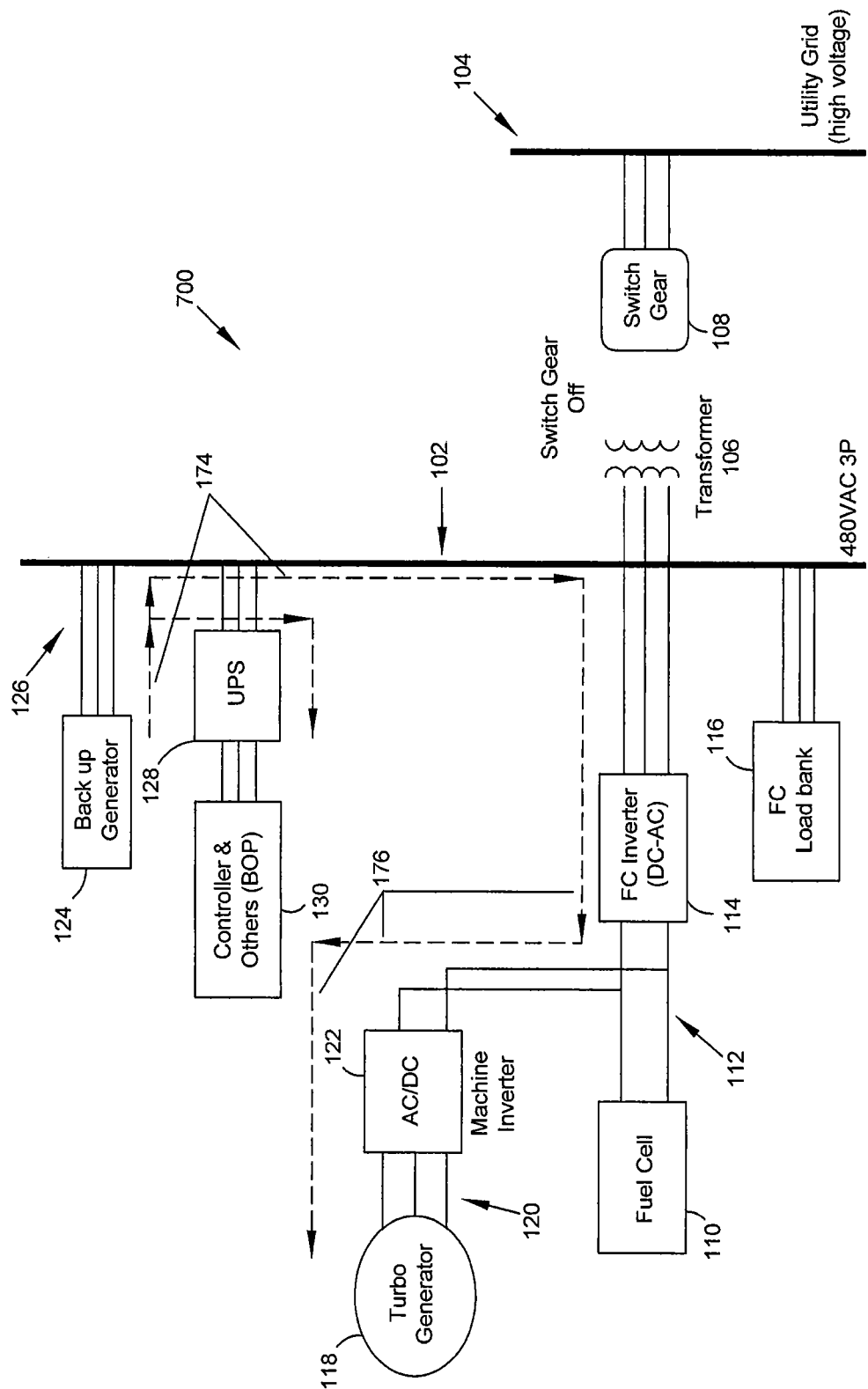
FIG. 7 is a schematic diagram of an electric system decoupled from an electric power distribution system and a backup generator providing electric power to the electric system in accordance with some embodiments of the present disclosure.

In accordance with some embodiments of present disclosure an electric system 700 is illustrated in FIG. 7. The electric system 700 may comprise a main AC bus 102, and electric power distribution system (EPDS) 104, transformer 106, switch 108, fuel cell 110, DC output bus 112, inverter 114, load bank 116, turbine generator 118, AC output bus 120, inverter 122, backup generator 124, AC output bus 126, uninterruptible power supply (UPS) 128 and control system 130, which may be similar to the main AC bus 102, and electric power distribution system (EPDS) 104, transformer 106, switch gear 108, fuel cell 110, DC output bus 112, inverter 114, load bank 116, turbine generator 118, AC output bus 120, inverter 122, backup generator 124, AC output bus 126, uninterruptible power supply (UPS) 128 and control system 130 as described above.

As shown in FIG. 7, the main AC bus may be electrically decoupled form the EPDS 104. The fuel cell 110 may not be generating electric power, providing any generated electric power to the DC output bus 112, or both. The turbine generator 118 may be drawing power from the main AC bus 102 and operating in a motoring mode. The backup generator 124 may be generating and providing electric power to the main AC bus 102. The UPS 128 may be drawing electric power from the main AC bus 102.

The fuel cell 110 may not be generating or otherwise providing electric power to the DC output bus 112 for some reason, e.g., a loss of fuel flow, oxidant flow, or both, an electric problem for which the fuel cell 110 should be isolated from the rest of the fuel cell power plant, the fuel cell 110 may be starting-up or shutting-down or for some other reason. Even though the fuel cell 110 may not be providing electric power to the rest of the fuel cell power plant, the compressor of the turbine generator 118 may provide a flow of oxidant or other fluid to the fuel cell for heat balance, heat-up, cool-down, or other fuel cell system operations. The electric power to operate turbine generator 118 in a motoring mode may be provide by backup generator 124. In some embodiments, the electric power to operate turbine generator 118 may be provided by the UPS 128, the load bank 116, or some combination of the two, possibly in conjunction with or separate from the backup generator 124. The backup generator 124 may also be used to provide electric power to the UPS 128 that, in turn, provides a steady supply of power to the control system 130. In some embodiments, load bank 116 may also provide electric power to the UPS 128.

These flows of electric power are illustrated on FIG. 7. Arrow 174 shows the backup generator 124 supplying generated electric power to the AC output bus 126 and main AC bus 102. From the main AC bus 102, electric power may flow to the turbine generator 118 as shown by arrows 176. The electric power flowing to turbine generator 118 may flow through inverter 114 that converts the AC power on the main AC bus 102 to DC power to be applied to the DC output bus 112. The DC power on the DC output bus 112 may then flow to the AC output bus 120 through inverter 122. Inverter 122 may be configured to provide required the current, voltage, phase(s), real and reactive power, or a combination of these, on the AC output bus 120 in order to control the rotational speed of turbine generator 118, thereby effecting the resultant flow of oxidant or other fluid through the fuel cell 110 caused by the compressor of turbine generator 118.

Electric power may also flow from the main AC bus 102 to the UPS 128. The UPS may provide a continuous supply of electric power to control system 130.

Figure 8:
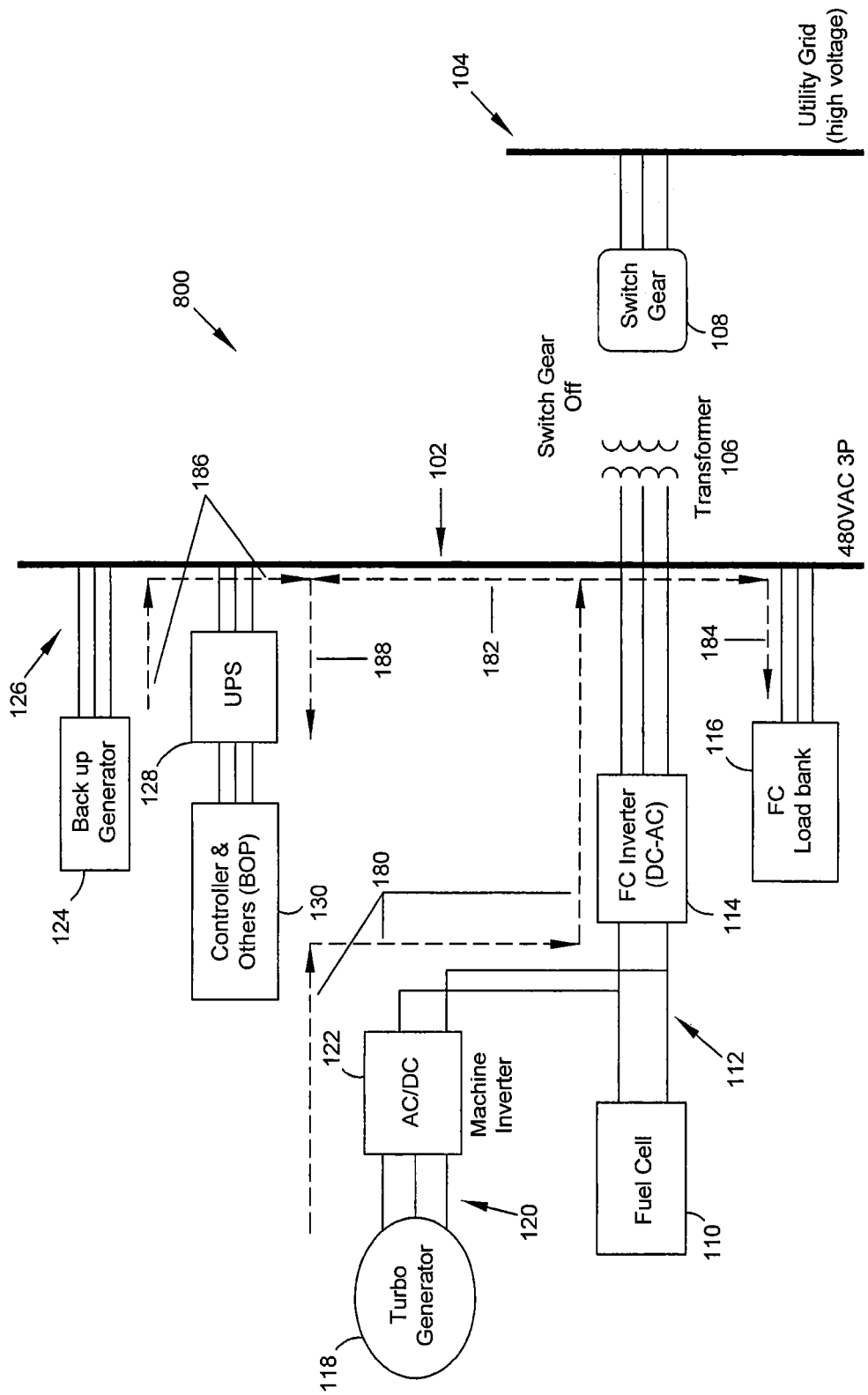
FIG. 8 is a schematic diagram of an electric system decoupled from an electric power distribution system and a backup generator and a turbine generator providing electric power to the electric system in accordance with some embodiments of the present disclosure.

In accordance with some embodiments of present disclosure an electric system 800 is illustrated in FIG. 8. The electric system 800 may comprise a main AC bus 102, and electric power distribution system (EPDS) 104, transformer 106, switch 108, fuel cell 110, DC output bus 112, inverter 114, load bank 116, turbine generator 118, AC output bus 120, inverter 122, backup generator 124, AC output bus 126, uninterruptible power supply (UPS) 128 and control system 130, which may be similar to the main AC bus 102, and electric power distribution system (EPDS) 104, transformer 106, switch gear 108, fuel cell 110, DC output bus 112, inverter 114, load bank 116, turbine generator 118, AC output bus 120, inverter 122, backup generator 124, AC output bus 126, uninterruptible power supply (UPS) 128 and control system 130 as described above.

As shown in FIG. 8, the main AC bus 102 may not be electrically coupled to the EPDS 104. The fuel cell 110 may not be generating electric power, providing electric power to the DC output bus 112, or both. The turbine generator 118 may be generating electric power and providing that electric power to the AC output bus 120. The load bank 116 may be drawing power from the main AC bus 102. The backup generator 124 may be generating electric power and providing that power to the main AC bus 102 via the AC output bus 126. The UPS 128 may be drawing power from the main AC bus 102 and providing power to the control system 130.

The fuel cell 110 may not be generating or otherwise providing electric power to the DC output bus 112 for reasons similar to those described above. While the fuel cell 110 may not be providing electric power, a flow of oxidant or other fluid may still be provided to the fuel cell 110 for start-up, shut-down, heat-up, cool-down or other operations needed to operate the fuel cell 110 in a safe manner. The flow of this fluid may be provided by the turbine generator 118 via a compressor which pressurizes and supplies the oxidant or other fluid to the fuel cell 110. As the flow requirements in the fuel cell 110 lower, the compressor may need to provide lower flowrates of the oxidant, or other fluid, to fuel cell 110, less compression of the oxidant or other fluid, or both. These lower flowrates or lower compression may be achieved by slowing the rotation of the compressor of turbine generator 118. Consequently, the electric output from the turbine generator 118 may vary over time. This varying electric output of the turbine generator 118 may at some point reach a level where the turbine generator 118 may no longer be relied upon to provide a steady power supply to the UPS 128, and from there to the control system 130. In some embodiments, electrical power may be drawn from the turbine generator 118 in order to slow the turbine.

To avoid issues that may arise from the lack of constant power supply from the turbine generator 118, the backup generator 124 may be started to provide electric power. The backup generator 124, having no mechanical interoperation with the fuel cell 110, does not have the same external operating requirements as does the turbine generator 118, and therefore may provide a more reliable source of electric power to the UPS 128 and control system 130.

The load bank 116 may be configured to draw an amount of power equal to the difference between the power generated by the turbine generator 118 and backup generator 124 and the amount of power drawn by the UPS 128 and any system losses. The load bank 116 may begin drawing power from the main AC bus 102 as soon as the backup generator 124 is providing power to the main AC bus 102. In some embodiments, the start-up of backup generator 124 may be based on the expected time at which the turbine generator 118 may no longer be capable of providing a constant supply of power to keep UPS 128 charged as UPS 128 continuously supplies power to control system 130. In some embodiments, the backup generator 124 may be supplying power to the main AC bus 102 prior to the above mentioned point. During this period the load bank 116 may draw an amount of power equal to that generated and place on the main AC bus by the turbine generator. In this manner, flows may be balanced by use of the load bank for system requirements.

The flow of electric power is illustrated in FIG. 8. Turbine generator 118 generates some electric power that is provided from the AC output bus 120 to the DC output bus 112 through inverter 122, and then from the DC output bus 112 to the main AC bus 102 through inverter 114 as represented by arrows 180. At the main AC bus 102 this power may flow to the UPS 128, load bank 116, or both as shown by arrow 182. Arrow 184 represents the power drawn from the main AC bus 102 by the load bank 116, and arrow 188 represent the power drawn from the main AC bus by the UPS 128. The backup generator 124 provides power to the UPS 128 via the main AC bus 102 and the AC output bus 126 as shown by arrow 186. As can be seen in FIG. 8, both the turbine generator 118 and backup generator 124 may be configured to supply power to the UPS 128. Excess power generated by the turbine generator 118, and possibly the backup generator 124, may also be drawn by the load bank 116.

Figure 9:
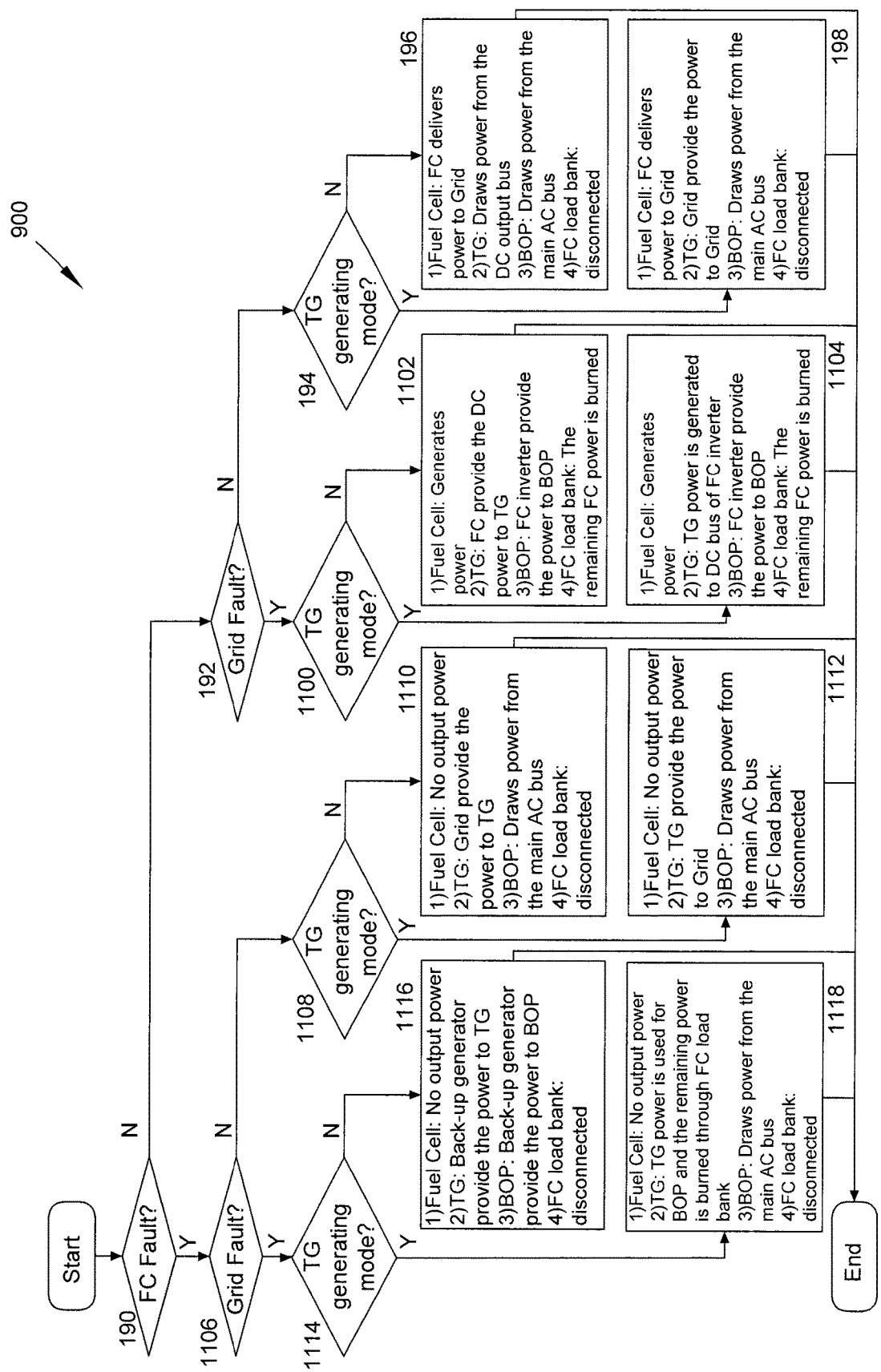
FIG. 9 is an operational-state flow diagram for an electric system in accordance with some embodiments of the present disclosure.

In accordance with some embodiments of the present disclosure an operational-state flow diagram 900 for an electric system in accordance with some embodiments of the present disclosure is illustrated in FIG. 9. The electric system may be similar to the electric systems 100, 200, 300, 400, 500, 600, 700 and 800 as described above.

The operational-state flow diagram 900 illustrates possible resultant operating conditions and power flows to and from electric system components based on the operating state of one or more components of the electric system. For example, the operational condition and power flows to and from various components in the electric system are dependent on the operating state of the electric system fuel cell (Block 190), the electric power distribution system (Blocks 1106 and 192) and the turbine generator (Blocks 1114, 1108, 1100 and 194).

If the fuel cell is generating electric power and does not have a fault (Block 190 "No" branch), the electric system may have four possible operating states (Blocks 196, 198, 1102 and 1104) based on the operating condition of the electric power distribution system (Block 192) and the turbine generator (Blocks 194 and 1100). For example, if the electric system (also known as a power plant or fuel cell power plant) is electrically coupled to the electric power distribution system (Block 192, "No" branch) the fuel cell may operate in a power generating mode that provides power to the electric power distribution system (as described above), the control system may be operated by drawing power from the main AC bus (as described above) and the load bank may be disconnected from the main AC bus. If the turbine generator is operating in a power generating mode, the turbine generator will provide that power to the electric power distribution system (as described above). This operational state is indicated by Block 198. If the turbine generator is operated in a motoring mode, the turbine generator will draw power from the DC output bus (as described above). This operational state is indicated by Block 196.

If the fuel cell is generating electric power and does not have a fault (Block 190 "No" branch), and if the electric system (also known as a power plant or fuel cell power plant) is decoupled from the electric power distribution system (Block 192, "Yes" branch) the fuel cell will operate in a power generating mode that provides power to the main AC bus (as described above), the control system will be operated by drawing power from the main AC bus (as described above) and the load bank may be electrically coupled to and draw power from the main AC bus (as described above). If the turbine generator is operating in a power generating mode, the turbine generator will provide that power to the main AC bus (as described above). This operational is indicated by Block 1104. If the turbine generator is operated in a motoring mode, the turbine generator will draw power from the DC output bus (as described above). This operational state is indicated by Block 1102. The load bank may draw an amount of power equal to the difference between the power generated by the fuel cell, any power generated by the turbine generator and the power drawn by the control system, any power drawn by the turbine generator and any electric losses.

If the fuel cell is not generating electric power, has a fault, or both (Block 190 "Yes" branch), the electric system may have four possible operating states (Blocks 1110, 1112, 1116 and 1118) based on the operating condition of the electric power distribution system (Block 1106) and the turbine generator (Blocks 1108 and 1114). For example, if the electric system (also known as a power plant or fuel cell power plant) is electrically coupled to the electric power distribution system (Block 1106, "No" branch) the fuel cell will not operate in a power generating mode that provides power to the electric power distribution system (as described above), the control system will be operated by drawing power from the main AC bus (as described above) and the load bank will be disconnected from the main AC bus (as described above). If the turbine generator is operating in a power generating mode, the turbine generator will provide that power to the electric power distribution system (as described above). This operational is indicated by Block 1112. If the turbine generator is operated in a motoring mode, the turbine generator will draw power from the DC output bus (as described above). This operational state is indicated by Block 1110.

If the fuel cell is not generating electric power, has a fault, or both (Block 190 "Yes" branch), and if the electric system (also known as a power plant or fuel cell power plant) is electrically decoupled from the electric power distribution system (Block 1106, "Yes" branch) the fuel cell will not operate in a power generating mode that provides power to the main AC bus (as described above), the control system will be operated by drawing power from the main AC bus (as described above), the load bank will be electrically coupled to and draw power from the main AC bus (as described above) and the backup generator will provide power to the main AC bus (as described above). If the turbine generator is operating in a power generating mode, the turbine generator will provide that power to the main AC bus (as described above). This operational is indicated by Block 1118. If the turbine generator is operated in a motoring mode, the turbine generator will draw power from the DC output bus (as described above). This operational state is indicated by Block 1116. The load bank may draw an amount of power equal to the difference between any power generated by the backup generator and the turbine generator, and the power drawn by the control system, the turbine generator, and system losses.

Figure 10:
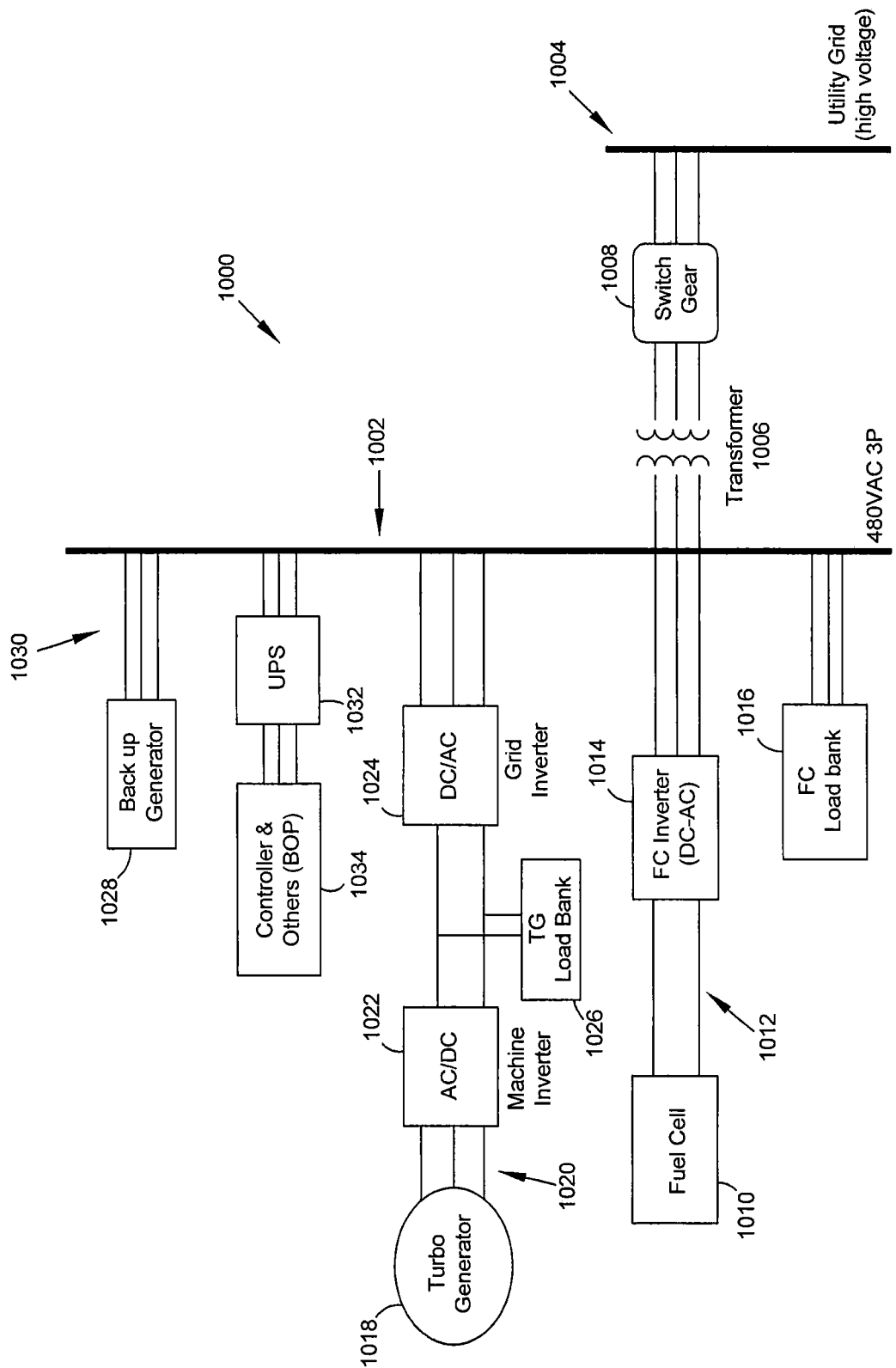
FIG. 10 is a schematic diagram of an electric system in accordance with some embodiments of the present disclosure.

In accordance with some embodiments of the present disclosure, an electric system 1000 is illustrated in FIG. 10. The electric system 1000 may comprise a main AC bus 1002, an electric power distribution system (EPDS)(which may be known as a utility grid) 1004, a transformer 1006, a switch (which may be known as switch gear) 1008, a fuel cell 1010, a DC output bus 1012, an inverter 1014, a first load bank 1016, a turbine generator 1018, an AC output bus 1020, an inverter 1022, an inverter 1024, a second load bank 1026, a backup generator 1028, an AC output bus 1030, an uninterruptible power supply (UPS) 1032 and a control system 1034. The main AC bus 1002, the electric power distribution system 1004, the transformer 1006, the switch gear 1008, the fuel cell 1010, the DC output bus 1012, the inverter 1014, the first load bank 1016, the turbine generator 1018, the AC output bus 1020, inverter 1022, the backup generator 1028, the AC output bus 1030, the uninterruptible power supply (UPS) 1032 and the control system 1034 may be similar to the main AC bus 102, the electric power distribution system 104, the transformer 106, the switch gear 108, the fuel cell 110, the DC output bus 112, the inverter 114, the load bank 116, the turbine generator 118, the AC output bus 120, inverter 122, the backup generator 124, the AC output bus 126, the uninterruptible power supply (UPS) 128 and the control system 130 as described above.

The main AC bus 1002 may be electrically coupleable or connectable to EPDS 1004 by transformer 1006 and switch gear 1008. In some embodiments, additional components, e.g., breakers and disconnects, may be electrically coupled between the main AC bus 1002 and the EPDS 1004. These additional components may provide further coupling and protective functions for the main AC bus 102, components electrically coupled thereto, or both. The main AC bus 1002, and equipment attached thereto, may be configured to support AC electric power, e.g., three-phase AC electric power.

The electric power distribution system (EPDS) 1004 may be a national or regional electric grid. In some embodiments, the EPDS 1004 may be any system in which multiple electric power generators, power transferring equipment, electric loads, or any combination of the foregoing are electrically coupled.

The transformer 1006 may transform electric current from one voltage into another. In some embodiments, the transformer 1006 may transform a three phase AC voltage of the main AC bus 1002 into a different three phase AC voltage of the EPDS 1004. Additionally, transformer 1006 may isolate the voltage of the main AC bus 1002 from the voltage of the EPDS 1004. Transformer 1006, while shown a single component, may comprise multiple transformers, other components, or both that are capable of providing the functions of transformer 1006. Additionally, while transformer 1006 is shown as being located between the main AC bus 1002 and switch gear 1008, it should be recognized that the locations of transformer 1006 and switch gear 1008 relative to one another and the main AC bus 1002 and EPDS 1004 may be altered.

Switch gear 1008 may be capable of disconnecting (or uncoupling) the electric system of the fuel cell power plant from the EPDS 1004, e.g., in the event of an abnormal grid condition. Conversely, switch gear 1008 may be capable of connecting (or coupling) the electric system of the fuel cell power plant to the EPDS 1004, e.g., during normal grid conditions. When the switch gear 1008 electrically disconnects the fuel cell power plant from the EPDS, switch gear 1008 may be described as being in an open position; when switch gear 1008 electrically connects the fuel cell power plant to EPDS 1004 the switch may be described as being a closed positon.

While switch gear 1008 is characterized as a switch, a person of ordinary skill will understand that switch gear 108 may comprise any component, or number of components that may function to electrically connect and disconnect the fuel cell power plant from the EPDS 1004.

Fuel cell 1010 may be any particular type of a fuel cell. In some embodiments, the fuel cell 1010 may be a solid oxide fuel cell. Fuel cell 1010 may comprise a plurality of fuel cells each comprising an anode, a cathode and an electrolyte. The fuel (e.g., methane, natural gas, $H_2$, CO, etc.) may be combined with the oxidant (e.g., oxygen extracted from or forming a part of the ambient air) at the anode to form reaction products that may include water and electrons. These electrons may travel to the cathode through one or more interconnects where the electrons ionize the oxidant. The ionized oxidant may then travel through the solid oxide electrolyte, which may be impervious to the fluid fuel and oxidant. A plurality of fuel cells may be arranged in various series, parallel, or both combinations to generate a resultant system voltage, current, and power. This generated electric power may eventually be supplied to the EPDS 1004.

DC output bus 1012 provides the electric coupling between the fuel cell 1010 and the inverter 1014. While DC output bus 1012 is shown in FIG. 10 as mere electric connections, a person of ordinary skill will understand that FIG. 10 is a simplified diagram. In addition to providing the aforementioned connections, DC output bus 1012 may comprise one or more breakers, switches, instrumentation or connections for instrumentation, or any other component for proper, safe and efficient operation.

Inverter 1014 provides the electric connection (coupling and decoupling) and conversion of AC to DC or DC to AC between the DC output bus 1012 and the main AC bus 1002. DC power provided to inverter 1014 may be converted into AC power by inverter 1014. When the fuel cell power plant is electrically connected to the EPDS 1004 (aka "grid dependent mode"), the inverter 1014 may synchronize the AC voltage and phase(s) of the converted DC power (from the DC output bus 1012) to the EPDS 1004 voltage and phase(s) (the main AC bus 1002 voltage and phase(s) may be configured to match the EPDS 1004 voltage and phase(s)) while controlling the AC current, AC real power, reactive power or both, or any combination of the foregoing resulting from the conversion of the DC electric power from DC output bus 1012. When the fuel cell power plant is electrically disconnected from the EPDS 1004 (aka "grid independent mode"), the inverter 1014 may independently control the AC output voltage and phase(s) from the conversion of the electric power from the DC output bus 1012 separately from or in addition above mentioned characteristics. Additionally, inverter 1014 may have protective functions such a current limit (maximum, maximum long duration, maximum short duration), DC link voltage limit, frequency variation limit, etc.

While inverter 1014 is illustrated in FIG. 10 as a single component, one of ordinary skill will understand that FIG. 10 is a simplified diagram. Inverter 1014 may comprise a plurality of electric components configured as required to perform the functions of inverter 1014 as described above.

Load bank 1016 may be coupled to may be electrically connected (coupled) to the main AC bus 1002. Load bank 1016 may function to consume excess electric power in the event that the fuel cell power plant must be rapidly disconnected from the EPDS 1004, e.g., on a grid fault event. In some instances, the fuel cell power plant must be decoupled from the EPDS 1004 in a manner faster than the fuel cell 1010, turbine generator 1018, or both can be shut down or reduce electric power output. With the fuel cell 1010, turbine generator 1018, or both still generating electric power, that power must be consumed because the electric loads provided through the EPDS 1004 are no longer coupled to the fuel cell power plant. This excess power is drawn by load bank 1016.

Load bank 1016 may be a flywheel bank, capacitor bank, resistor bank, battery bank, or a combination of the foregoing or any other electric load capable of consuming the excess power generated by the fuel cell power plant. One advantage of using a flywheel bank, capacitor bank, battery bank or combination thereof may be the mechanical, electric, or chemical storage of excess electric energy that may be recouped when the fuel cell power plant is recoupled to the EPDS 1004 or used to power loads of the fuel cell power plant (e.g., motoring turbine generator 1018 or powering control system 1034).

In some embodiments load bank 1016 may be directly coupled to the DC output bus 1012.

Turbine generator 1018 may be similar to the turbo-generator described above. For example, the turbine generator 1018 may comprise a compressor, turbine and generator connected in a suitable arrangement via shafts. The compressor may draw in and pressure an oxidant from the ambient air or other source. The pressurized oxidant may then flow through oxidant inlet and exhaust piping to provide oxidant to and remove oxidant from the fuel cell 1010. In some embodiments, the compressor may be configured to pressurize other fluid sources, e.g., reducing or inerting gases, for using in the fuel cell 1010, other supporting systems, or both. The oxidant exhausted from the fuel cell 1010 may be combined with the unused fuel from fuel cell 1010, or other fuel source, and combusted to provide a heated exhaust fluid. This heated exhaust fluid may be used to provide recuperating or other heat exchange functions with fuel, oxidant or both prior to entering the fuel cell 1010. The heated exhaust fluid may also be expanded through the turbine of turbine generator 1018 to provide the shaft work to rotate the compressor. The turbine may be mechanically coupled to a generator to produce electric power. The turbine generator 1018 may be operating in a "generating mode" when the rotational energy of the turbine and generator of turbine generator 1018 is converted into electric power by the generator.

In some embodiments, the generator of turbine generator 1018 may be configured to operate as a motor-generator such that an external source of electric power may be applied to the generator. The applied electric power may be converted into rotational energy of the generator, and therefore into rotational energy of the turbine generator 1018 as well. This mode of turbine generator 1018 operation may be referred to as a "motoring mode." In the motoring mode, the rotation of the turbine generator 1018 transferred to the compressor of turbine generator 1018 to pressure the oxidant, or other fluid source, for use by the fuel cell 1010. In some embodiments, the turbine of turbine generator 1018 may be decoupled from the generator, compressor, or both in order to reduce the amount of energy needed to rotate the compressor in the motoring mode.

AC output bus 1020 may electrically connectable (coupleable) to turbine generator 1018. AC output bus 1020 provides a structure, e.g., wires, cabling, bus bars or a combination thereof, that provide the electric connection between the turbine generator 1018 and the inverter 1022. While AC output bus 1020 is shown in FIG. 10 as mere electric connections, a person of ordinary skill will understand that FIG. 10 is a simplified diagram. In addition to providing the aforementioned connections, AC output bus 1020 may comprise one or more breakers, switches, instrumentation or connections for instrumentation, or any other component for proper, safe and efficient operation.

Inverter 1022 (which may also be known as a machine inverter) may provide electric coupling and electric conversion from the AC output bus 1020. For example, when the turbine generator 1018 is generating and providing electric power to the AC output bus 1020, inverter 1022 may convert this AC electric power into DC electric power. This conversion may require controlling the converted DC voltage. When the turbine generator 1018 is operating in a motoring mode, the inverter 1022 may convert DC electric power and supply AC power to the AC output bus 1020.

Inverter 1022 may also be used to control the speed of and torque place on the turbine generator 1018. Controlling the speed of the turbine of generator 1018 may also, regardless of operating mode of the turbine generator 1018, control, directly or indirectly, the speed of compressor. As described above, the compressor provides oxidant, or other fluid, that is used for the electro-chemical reaction of fuel cell 1010, or other operation, and as a means to control the temperature and rate-of-change of temperature of the fuel cell 1010 (e.g., heat-up or cool-down) as well as other functions related to the fuel cell 1010 or its support systems. The mechanical and electric interoperation of the fuel cell 1010 and turbine generator 1018, and the electric coupling of fuel cell power plant and the EPDS 1004 can be managed by an electric system comprising one or more of the components disclosed in FIG. 10.

Inverter 1024 (which may be known as a machine inverter) may provide electric coupling and electric conversion from inverter 1022 to the main AC bus 1002. For example, when the turbine generator 1018 is generating and providing electric power to the AC output bus 1020, inverter 1022 may convert this AC electric power into DC electric power that is then converted by inverter 1024 to AC power for application on the main AC bus 1002. This may convert the supplied DC power to the three phase AC voltage and current for application to the main AC bus 1002. When the turbine generator 1018 is operating in a motoring mode, the inverter 1024 may convert AC power to DC electric power that is then converted to AC power and supplied to AC output bus 1020.

In some embodiments, the functionality of inverter 1022 and 1024 may be combined such that the functionality of both may be performed by a single component. For example, a combined inverter 1022 and 1024 may convert the AC power provided to the AC output bus 1020 to the voltage and phase(s) of the main AC bus 1002, which may match those of EPDS 1004, while controlling the AC current, and real and reactive power of the converted AC power. The combined component may also be used to control the speed and torque of the turbine generator 1018 to thereby effect the desired oxidant or other fluid flow to fuel cell 1010 as described above.

In some embodiments, inverter 1022 and inverter 1024 may be in series with one another.

Second load bank 1026 (which may be known as a Turbine Generator (TG) load bank) may draw and consume electric power generated by the turbine generator on a grid fault event. Load bank 1026 may be coupled to may be electrically connected (coupled) to the main AC bus 1002 via inverter 1024, inverter 1022 or both. Load bank 1026 may function to consume excess electric power in the event that the fuel cell power plant must be rapidly disconnected from the EPDS 1004, e.g., on a grid fault event. In some instances, the fuel cell power plant must be decoupled from the EPDS 1004 in a manner faster than the fuel cell 1010, turbine generator 1018, or both can be shut down or reduce electric power output. With the fuel cell 1010, turbine generator 1018, or both still generating electric power, that power must be consumed because the electric loads provided through the EPDS 1004 are no longer coupled to the fuel cell power plant. This excess power may be consumed by load bank 1026.

Load bank 1026 may be a flywheel bank, capacitor bank, resistor bank, battery bank, or a combination of the foregoing or any other electric load capable of consuming the excess power generated by the fuel cell power plant. One advantage of using a flywheel bank, capacitor bank, battery bank or combination thereof may be the mechanical, electric, or chemical storage of excess electric energy that may be recouped when the fuel cell power plant is recoupled to the EPDS 1004 or used to power loads of the fuel cell power plant (e.g., motoring turbine generator 1018 or powering control system 1034).

In some embodiments, load banks 1016 and 1026 may be configured for interoperation. For example, load bank 1016 may be configured to consume electric power generated from the fuel cell 1010, turbine generator 1018, or both. Load bank 1026 may be configured to consume electric power generated from the fuel cell 1010, turbine generator 1018, or both. In some embodiments, load bank 1016 and load bank 1026 consume power generated only from the fuel cell 1010 or turbine generator 1018, respectively, and possibly other electric loads from, e.g., the backup generator 1028. In these and other embodiments, the design and configuration of load banks 1016 and 1026 provide for greater flexibility in the design of electric system 1000.

The backup generator 1028 may be, e.g., a diesel, gasoline, natural gas, or other generator. In some embodiments, the backup generator 1028 may be wind powered generator or solar generator. As will be appreciated by those of skill in the art, the particular type of component that comprises backup generator 1028 may be any type suitable for power generation, conversion, or storage which is capable of meeting the system design limitations of ready availability in case of a grid-fault event and of sufficient capacity to power the control system 1034 and motor turbine generator 1018 during fuel cell cool down and other system design criteria. It should be understood that backup generator 1028 may comprise multiple components of varying types to meet the aforementioned system design criteria.

Backup generator 1028 may provide supplementary power to the fuel cell power plant in case of abnormal operating conditions. For example, if the fuel cell power plant is not coupled to the EPDS 1004, the backup generator may provide a source of electric power. In some embodiments, the fuel cell 1010 may not be generating electric power while the turbine generator 1018 is generating electric power. The backup generator 1028 here may be used to provide a steady source of electric power to the power plant control system 1034. While the turbine generator 1018 may be able to provide some power to the control system 1034, the availability and amount of the power generated by turbine generator 1018 may vary. The turbine generator 1018 may be controlled in order to provide the oxidant or other fluid flow required for a safe cool-down (or heat-up or other operation) of the fuel cell 1010. In addition to supplying steady electric power for control system 1034, the electric power generated by the backup generator 1028 may provide electric power to inverter 1022, via inverter 1024, in order power turbine generator 1018 when operated in a motoring mode.

In some embodiments, the backup generator 1028 may not be providing power to the AC output bus 1030. However, this does not mean that the backup generator may not be operating in some fashion. For example, the backup generator 1028 may be operated for warm-up or cool-down operations, maintenance, or other operations in which no AC power is provided from the backup generator 1028 to the AC output bus 1030. In some embodiments, the backup generator 1028 may provide power to the AC output bus 1030 that is electrically decoupled from the main AC bus 1002.

AC output bus 1030 may couple backup generator 1028 to the main AC bus 1002. As described above for AC output bus 1020 and DC output bus 1012, FIG. 10 illustrates a simplified diagram of electric system 1000. AC output bus 1030 may comprise additional components providing additional functionality.

Uninterruptible power supply (UPS) 1032 may electrically couple control system 1034 to the main AC bus 1002. Additionally, UPS 1032 provides for the storage of electric energy to be used during the interruption of power from other sources, e.g., a failure of the EPDS 1004, fuel cell 1010, turbine generator 1018, backup generator 1028, or any combination of the foregoing. UPS 1032 may further provide continuous power to the control system 1034 during transitions of electric power sources or at any time that the electric power from other sources is unavailable. UPS 1032 may also condition (e.g., control the voltage, phase(s), etc.) the power drawn by the control system 1034. UPS 1032 may be a battery, chemical, electric or mechanical, or other component configured to provide the above described functionality.

UPS 1032 may draw power from the main AC bus 1002. The power on the main AC bus may be provided by EPDS 1004, fuel cell 1010, turbine generator 1018, backup generator 1028, load bank 1016 or 1026, or a combination of these or other components.

Control system 1034 (which may also be referred to as a "balance of plant") may be configured to control, monitor and communicate with each component in electric system 1000 for safe operation of the system. In addition, control system 1034 may provide power to various components in the system 1000, including other components not shown in FIG. 10. For example, control system 1034 may control the operation of valves, heaters, pumps, remotely operated breakers and switches, lights, instrumentation (temperature, pressure, flow, etc.), locks, automatic or manual remote protection systems and other components that may enhance the safe or efficient operation of the fuel cell power plant. Control system 1034 may be configured to control the operation of the above listed and other components for a plurality of subsystems used to support the operations of electric system 1000.

Figure 11:
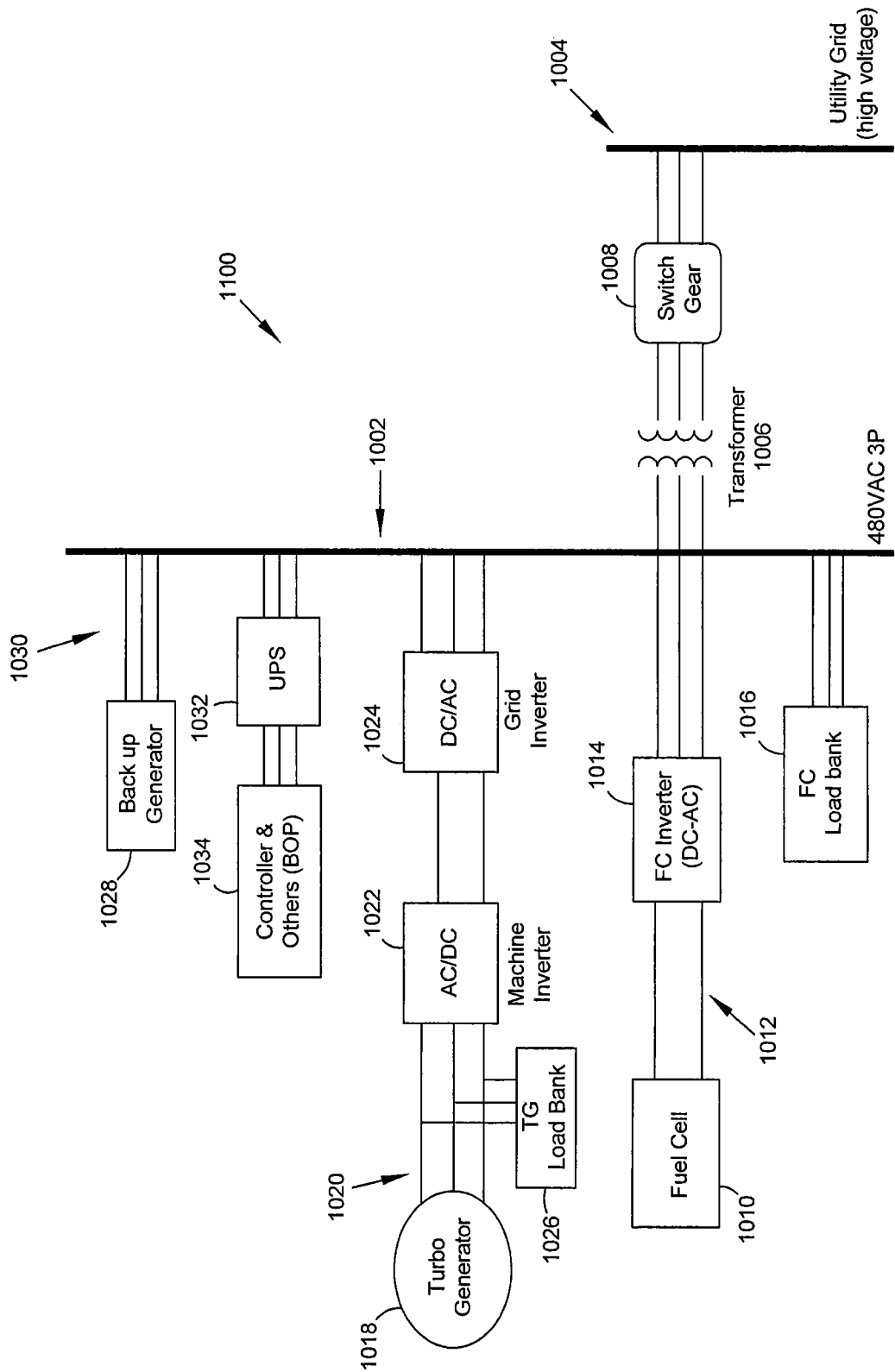
FIG. 11 is a schematic diagram of an electric system in accordance with some embodiments of the present disclosure.

In accordance with some embodiments of the present disclosure, an electric system 1100 is illustrated in FIG. 11. The electric system 1100 may comprise a main AC bus 1002, an electric power distribution system (EPDS) 1004, a transformer 1006, a switch gear 1008, a fuel cell 1010, a DC output bus 1012, an inverter 1014, a first load bank 1016, a turbine generator 1018, an AC output bus 1020, an inverter 1022, an inverter 1024, a second load bank 1026, a backup generator 1028, an AC output bus 1030, an uninterruptible power supply (UPS) 1032 and a control system 1034 that may be similar to those components described above.

As shown in FIG. 11, second load bank 1026 is coupled to the AC output bus 1020. This contrasts to FIG. 10 in which the second load bank 1026 is coupled to a DC bus located between inverters 1022 and 1024. In some embodiments, the fuel cell power plant may not contain a second load bank 1026, rather, load bank 1016 may function to consume the excess power generated by both fuel cell 1010 and turbine generator 1018. Embodiments which contain two load banks 1016 and 1026 may provide for a different manner of controlling of the power consumed from turbine generator 1018 and a different manner by which the rotational speed of the compressor of turbine generator 1018 may be controlled. Two independent controls also increase the reliability of the system; if one load bank is not functioning as designed, the second may provide a means for backing-up the other, thereby providing redundancy. Additionally, a second load bank may provide alternate means for accurately controlling the speed of the turbine generator even in the event of a grid fault. However, in some embodiments, only one load bank may be used.

Figure 12:
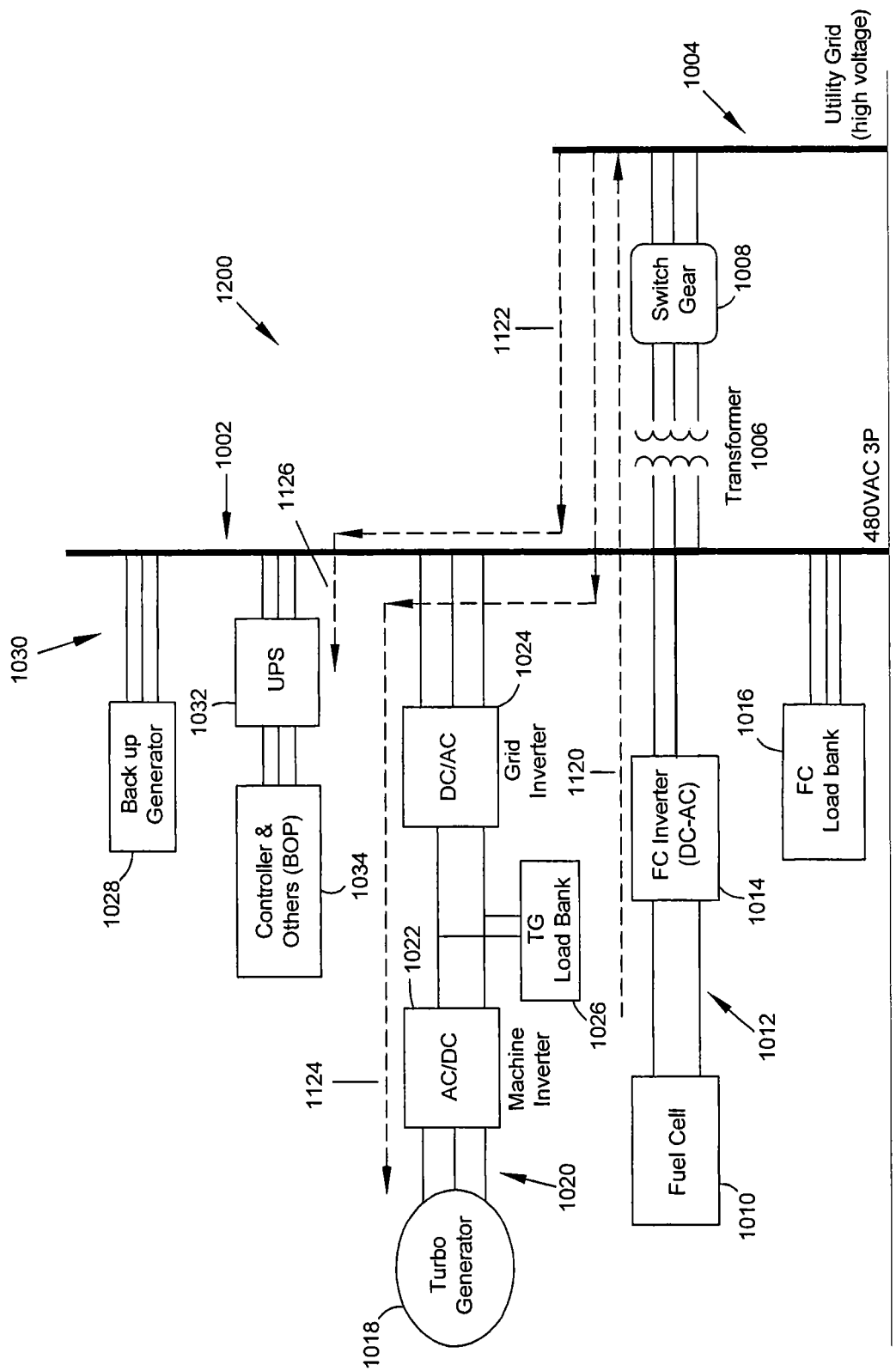
FIG. 12 is a schematic diagram of an electric system coupled to an electric power distribution system and a fuel cell providing electric power to the electric power distribution system in accordance with some embodiments of the present disclosure.

In accordance with some embodiments of the present disclosure, an electric system 1200 is illustrated in FIG. 12. The electric system 1200 may comprise a main AC bus 1002, an electric power distribution system (EPDS) 1004, a transformer 1006, a switch gear 1008, a fuel cell 1010, a DC output bus 1012, an inverter 1014, a first load bank 1016, a turbine generator 1018, an AC output bus 1020, an inverter 1022, an inverter 1024, a second load bank 1026, a backup generator 1028, an AC output bus 1030, an uninterruptible power supply (UPS) 1032 and a control system 1034 that may be similar to those components described above.

As shown in FIG. 12, the main AC bus 1002 may be connected to the EPDS 1004. This electric coupling may be achieved by switch gear 1008 being in a closed position. The EPDS 1004 may provide electric power to main AC bus 1002 and to components electrically coupled, directly or indirectly, thereto. The fuel cell 1010 may be generating and providing DC power to the DC output bus 1012 which, in turn, provides power to inverter 1014. The fuel cell inverter may convert the provided DC power to AC power and supply that AC power to the main AC bus 1002. The turbine generator 1018 may be operating in a motoring mode, drawing power from the main AC bus 1002 through inverters 1022 and 1024 in order to convert electric energy into rotational energy of the turbine, compressor, or both of turbine generator 1018. The compressor of turbine generator 118 may be rotated to pressure oxidant, or other fluid for use by the fuel cell 110 for the electro-chemical reaction therein, for heat-up or cool-down operations, or for some other fuel cell system operation or support system operation. The backup generator 1028 may not be generating AC power or providing any generated power to the main AC bus 1002 via the AC output bus 1030. The backup generator 1028 may be operating for some other operation or reason. UPS 1032 may be drawing power from the main AC bus 1002 and may be supplying power to control system 1034. While there may be temporary imbalances between the power drawn by UPS 1032 and control system 1034, the average of these drawn powers will be such that UPS 1032 is able to recharge and maintain a full state of readiness.

Arrows 1120, 1122, 1124 and 1126 the flow of electric power in system 1200. Electric power from the EPDS 1004 may flow through switch gear 1008 and transformer 1006 to the main AC bus 1002 as shown by arrow 1122. Electric power from fuel cell 1010 may to the main AC bus 1002 as shown by arrow 1120. From the main AC bus 1002, power flows to the UPS 1032, inverter 1024 and EPDS 1004. From UPS 1032, electric power is provided to control system 1034. From the inverter 1024, power is converted into DC power and supplied to inverter 1022. Inverter 1022 converts the DC power from inverter 1024 in AC power. The converted AC power may be used to drive a permanent magnetic synchronous motor of the turbine generator 1018 at high speed. In this conversion, the AC current, voltage, and phase(s) may be controlled to achieve the desired rotational rate of the compressor of turbine generator 1018, thereby controlling the pressurization and flow of oxidant (or other fluid) for the fuel cell 1010.

Figure 13:
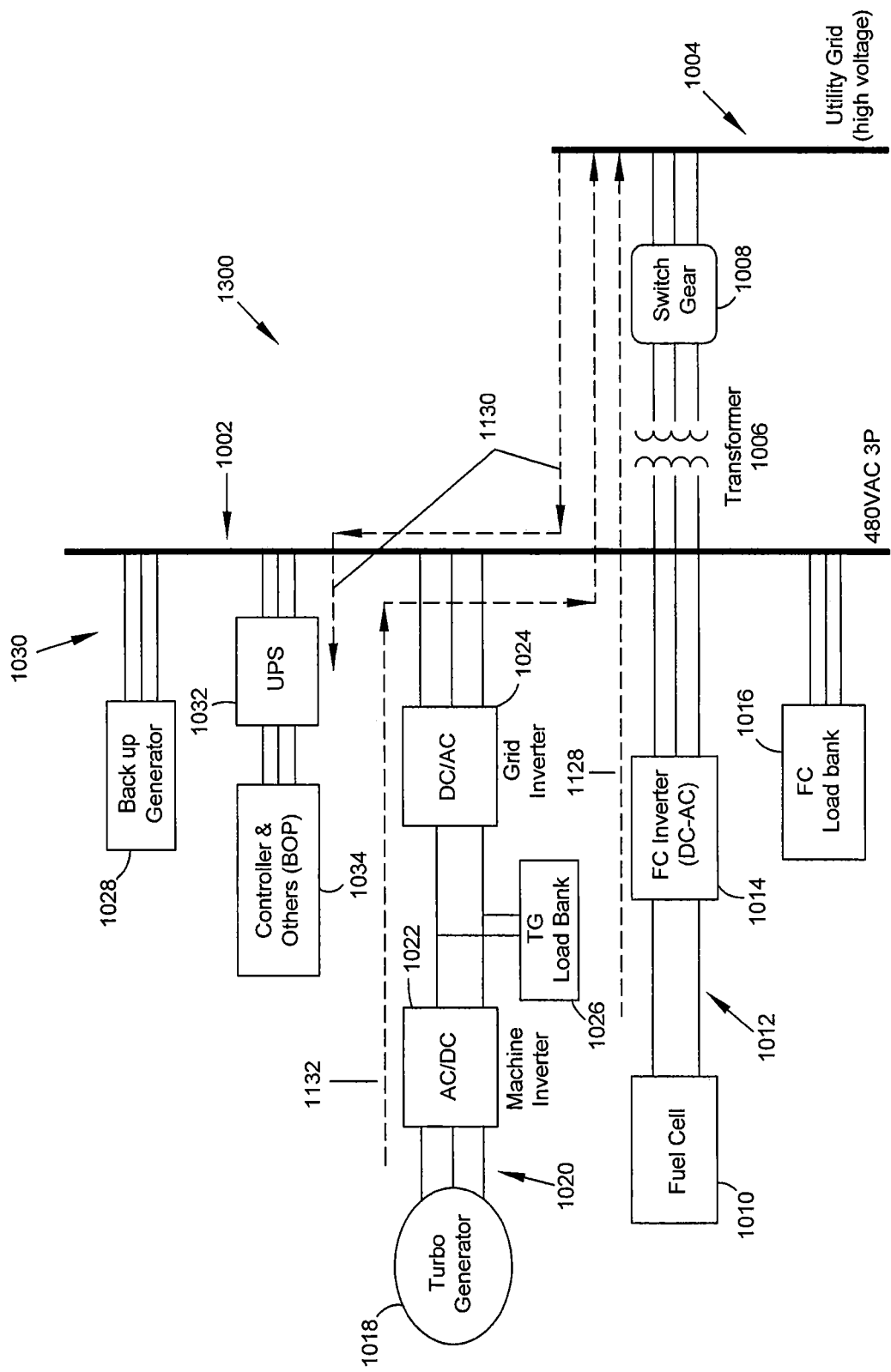
FIG. 13 is a schematic diagram of an electric system coupled to an electric power distribution system and a fuel cell and a turbine generator providing electric power to the electric power distribution system in accordance with some embodiments of the present disclosure.

In accordance with some embodiments of the present disclosure, an electric system 1300 is illustrated in FIG. 13. The electric system 1300 may comprise a main AC bus 1002, an electric power distribution system (EPDS) 1004, a transformer 1006, a switch gear 1008, a fuel cell 1010, a DC output bus 1012, an inverter 1014, a first load bank 1016, a turbine generator 1018, an AC output bus 1020, an inverter 1022, an inverter 1024, a second load bank 1026, a backup generator 1028, an AC output bus 1030, an uninterruptible power supply (UPS) 1032 and a control system 1034 that may be similar to those components described above.

As shown in FIG. 13, the main AC bus 1002 may be electrically coupled to the EPDS 1004, which may be effected by switch gear 1008 being in a closed position. The EPDS 1004 may provide electric power to main AC bus 1002 and to components electrically coupled, directly or indirectly, thereto. When the main AC bus 1002 is connected to the EPDS 1004, AC electric power is able to flow between the main AC bus 1002 and the EPDS 1004 as shown by arrows 1128 and 1130. As shown in FIG. 13, this configuration will allow for the UPS 1032 to be supplied with electric power from the main AC bus 1002 that may be generated by the turbine generator 1018, fuel cell 1010, backup generator 1028, the EPDS 1004, or some combination of the foregoing. In some embodiments, load bank 1016 may be configured to supply electric power to the main AC bus 1002 and components electrically coupled thereto.

Fuel Cell 1010 may be generating electric power via the previously described fuel cell electro-chemical reaction and thereby provide DC power to the DC output bus 1012, as shown by arrow 1128, and to main AC bus 1002 and the EPDS 1004 via transformer 1006 and switch gear 1008. Turbine generator 1018 may be generating electric power via the expansion of combusted fuel cell reaction products through a turbine and thereby provide AC power to the AC output bus 1020. The backup generator 1028 is not providing AC power to the AC output bus 1030. The UPS 1032 is drawing power from the main AC bus 1002.

As described above, the AC power generated by the turbine generator 1018 may be transferred from the AC output bus 1020 to the main AC bus 1002 via inverters 1022 and 1024. This flow of electric power is shown by arrow 1132. Inverter 1022 will convert the turbine generator 118 generated AC power into DC power. During this conversion, inverter 1022 may control the DC voltage, current, or both that results from this conversion. This DC power may be transferred to the main AC bus 1002 by inverter 1024. This flow of electric power is shown by arrow 1132. Inverter 1024 may convert the DC power to an AC voltage and phase(s) that is compatible with the voltage and phase(s) on the main AC bus 1002. The main AC bus 1002 may be electrically coupled to the EPDS 1004, and therefore, the voltage and phase(s) converted by inverter 1024 may be compatible with the voltage and phase(s) of the EPDS 1004. While conditioning this converted voltage to be compatible with those of EPDS 1004, the inverter may control the real and reactive power from conversion of the outputs of the turbine generator 1018. The converted electric power may then be used to supply the EPDS 1004 and loads attached therefore.

The backup generator 1028 may not be providing power to the AC output bus 1030. However, this does not mean that the backup generator may not be operating in some fashion. For example, the backup generator 1028 may be operated for warm-up or cool-down operations, maintenance, or other operations in which no AC power is provided from the backup generator 1028 to the AC output bus 1030. In some embodiments, the backup generator 1028 may provide power to the AC output bus 1030 that is electrically decoupled from the main AC bus 1002.

The UPS 1032 may be electrically coupled to and draw electric power from the main AC bus 1002. The electric power drawn by UPS 1032 may originate from the turbine generator 1018, the fuel cell 1010, the EPDS 1004, the backup generator 1028 (if connected to and providing power to the main AC bus 1002), or some combination of these sources.

In turn, control system 1034 draws electric power from the UPS 1032. To maintain the UPS 1032 at full capacity, the average power drawn by the control system 1034 may be less than the average power drawn by the UPS 1032.

Whether the fuel cell power plant is operated with the turbine generator 1018 (or 118 in other embodiments) in a generating or motoring mode may be influence by the temperature of the fuel cell system 1010 (or 110) exhaust and the ambient temperature. For example, if the output of the fuel cell system exhaust is constant, but the ambient temperature rises, the work produced by the expansion of the fuel cell exhaust across the turbine of turbine generator 1018 (or 118) may be insufficient to drive the compressor at a required rate to provide a required oxidant (or other fluid) flow to the fuel cell 1010 (or 110). Consequently, the turbine generator 1018 (or 118) may being drawing power from the AC bus 1002 (or 102) for the power required in excess of that produced by the turbine.

Figure 14:
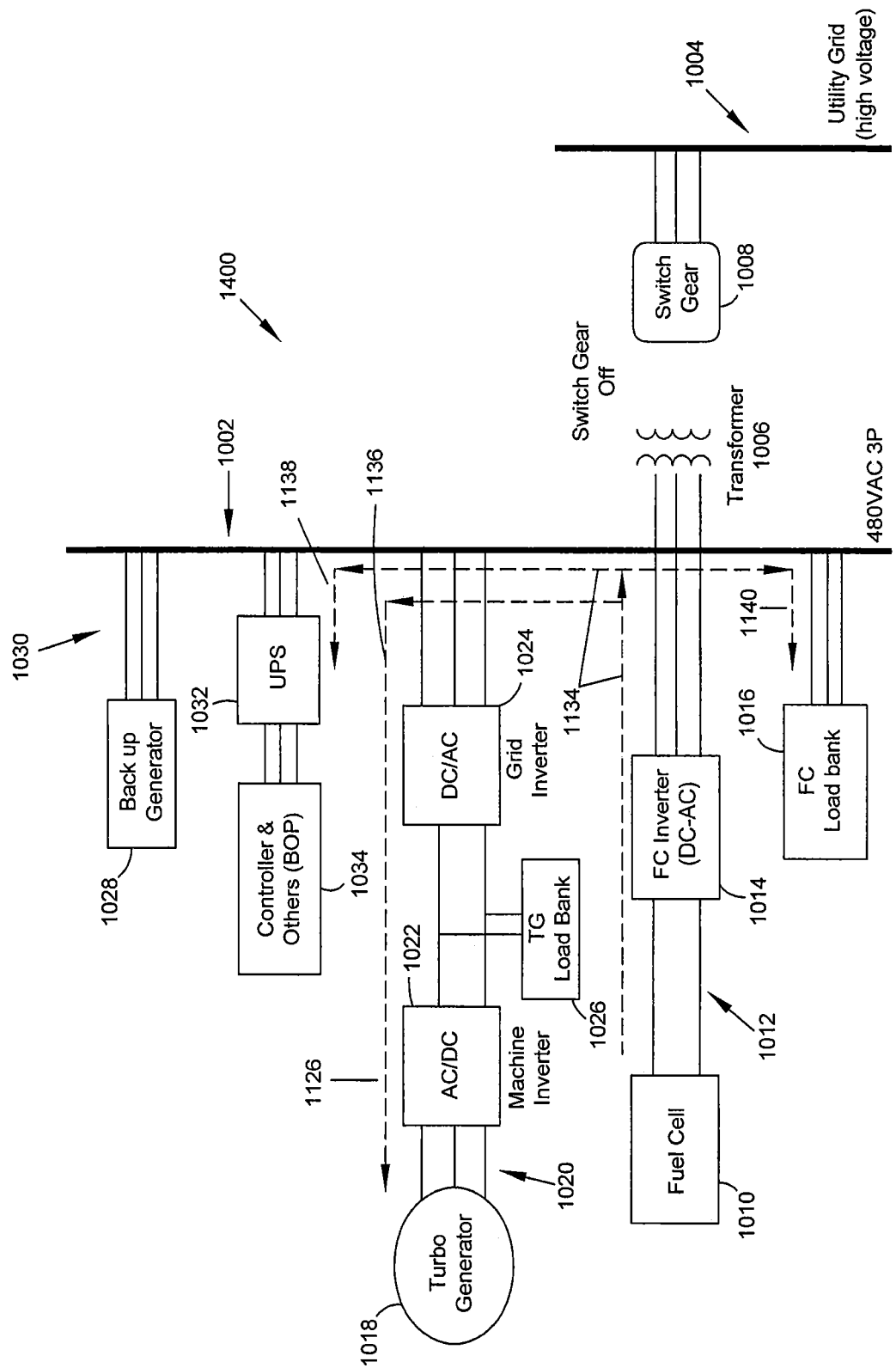
FIG. 14 is a schematic diagram of an electric system decoupled from an electric power distribution system and a fuel cell providing electric power to the electric system in accordance with some embodiments of the present disclosure.

In accordance with some embodiments of the present disclosure, an electric system 1400 is illustrated in FIG. 14. The electric system 1400 may comprise a main AC bus 1002, an electric power distribution system (EPDS) 1004, a transformer 1006, a switch gear 1008, a fuel cell 1010, a DC output bus 1012, an inverter 1014, a first load bank 1016, a turbine generator 1018, an AC output bus 1020, an inverter 1022, an inverter 1024, a second load bank 1026, a backup generator 1028, an AC output bus 1030, an uninterruptible power supply (UPS) 1032 and a control system 1034 that may be similar to those components described above.

As shown in FIG. 14, the main AC bus 1002 may not be electrically coupled to the EPDS 1004 because switch gear 1008 may be in an open position. The fuel cell 110 may be generating DC electric power and providing that generated power to the main AC bus 1002 via the DC output bus 1012 and inverter 1014. The load bank 1016 may be drawing power from the main AC bus 1002. Turbine generator 1018 may be drawing power from the main AC bus 1002 through inverters 1022 and 1024. The backup generator 1028 may not be providing power to AC output bus 1030. The UPS 1032 may be drawing power from main AC bus 1002.

The main AC bus 1002 may be disconnected from the EPDS 1004 due to a fault or some other condition of EPDS 1004 which may pose some threat to the fuel cell power plant, and therefore the fuel cell power plant may be disconnected from the EPDS 1004 as a protective measure. In some embodiments, the fuel cell power plant may need to be rapidly disconnected from the EPDS 1004 to ensure this protective measure is effective. In some embodiments, the fuel cell power plant may need to be disconnected from the EPDS 1004 due to a fault or other condition associated with the fuel cell power plant that may present a safety hazard to the EPDS 1004. Again, this hazard may be addressed by rapidly disconnecting the fuel cell power plant from the EPDS 1004 by opening switch gear 1008.

When switch gear 1008 is opened in a rapid manner, the fuel cell 1010 may be generating excessive electric power compared to that required to motor the turbine generator 1018 and power control system 1034. This excess electrical power can be expended by the fuel cell power plant, thereby avoiding the need to burn the fuel, supplied for the electro-chemical reaction in the fuel cell, elsewhere in the fuel cell system and thus generating unwanted heat. To consume this excess power, load bank 1016 may be electrically coupled to and draw power from the main AC bus 1002 of the fuel cell power plant. In some embodiments, the load bank 1016 consumes an amount of power equal to the difference between the power generated by the fuel cell 1010 and the power consumed by the motoring turbine generator 1018, operating control system 1034 and electric losses that may exist in the system 1400.

In some embodiments, the electric power produced by fuel cell 1010 may be lowered following an opening of switch gear 1008 such that the amount of power consumed by the load bank 1016 is reduced over time. The power output of fuel cell 1010 may be lowered to a point such that the power produced by the fuel cell 1010 is approximately the same as the power required to motor turbine generator 1018 (to supply oxidant for the electro-chemical reactions of fuel cell 1010, to provide oxidant or other fluid flow for heating-up or cooling down the fuel cell 1010, or a combination of these or other operations) and power the control system 1034.

In some embodiments, the load bank 1016 may include the ability to store excess power generated by the fuel cell system 1010 such that this power may be used as an additional source of backup power, may be utilized when the fuel cell power plant is reconnected to the EPDS 1004, or both.

The resultant power flows are shown in FIG. 14. Arrow 1134 shows the power that may be generated by the fuel cell 1010 and supplied to the DC output bus 1012 and the main AC bus 1002. This power may be split between power sent to the turbine generator 1018 and the UPS 1032 as represented by arrows 1136 and 1138, respectively. Power sent to the turbine generator 1018 may pass from the main AC bus 1002 to the AC output bus 1020 via inverters 1022 and 1024. Inverter 1022 may convert DC power to AC power for the AC output bus 1020. During this conversion, the inverter 1022 may convert the DC power to the required AC voltage and phase(s) to cause turbine generator 1018 to rotate at a speed sufficient to meet the airflow requirements of the fuel cell 1010.

DC power may be transferred from the DC output bus 1012 to the main AC bus 102 via inverter 1014. The inverter 1014 may control the voltage, phase(s), and real and reactive power of the resultant converted AC power. The inverter 1014 may be required to control the voltage and phase(s) of the converted power because the main AC bus 1002 is no longer electrically coupled to the EPDS 1004, and no other component may be controlling these electric properties of the power on the main AC bus 1002. The AC electric power may flow on the main AC bus 1002 to load bank 1016 and UPS 1032 as shown by arrows 1140 and 1138, respectively.

Figure 15:
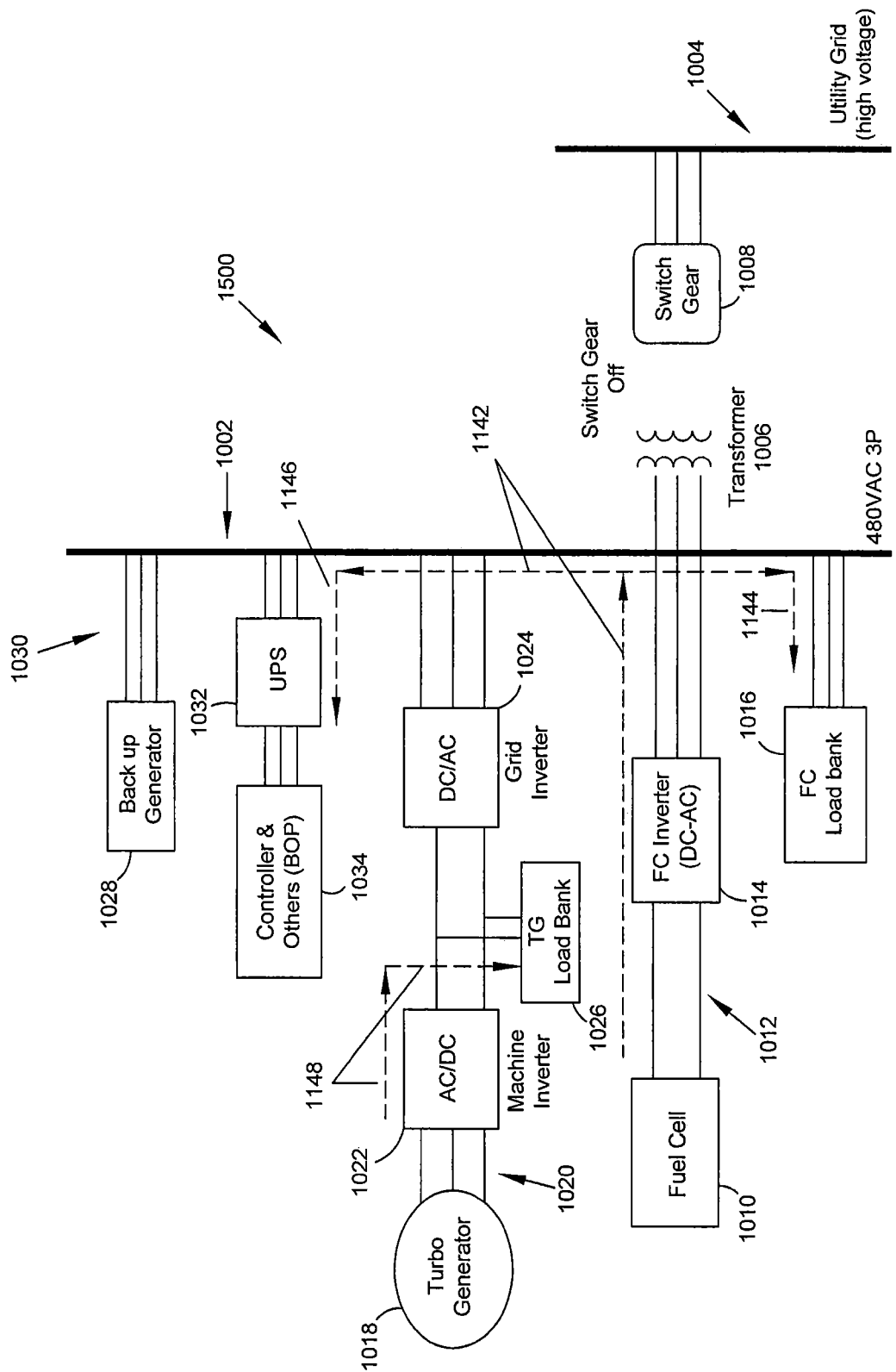
FIG. 15 is a schematic diagram of an electric system decoupled from an electric power distribution system and a fuel cell and turbine generator providing electric power to the electric system in accordance with some embodiments of the present disclosure.

In accordance with some embodiments of the present disclosure, an electric system 1500 is illustrated in FIG. 15. The electric system 1500 may comprise a main AC bus 1002, an electric power distribution system (EPDS) 1004, a transformer 1006, a switch gear 1008, a fuel cell 1010, a DC output bus 1012, an inverter 1014, a first load bank 1016, a turbine generator 1018, an AC output bus 1020, an inverter 1022, an inverter 1024, a second load bank 1026, a backup generator 1028, an AC output bus 1030, an uninterruptible power supply (UPS) 1032 and a control system 1034 that may be similar to those components described above.

As shown in FIG. 15, the main AC bus 1002 may be electrically decoupled from the EPDS 1004. The fuel cell 1010 may be generating electric power and providing that electric power to the main AC bus 1002 via inverter 1014. The load bank 1016 may be drawing power from the main AC bus 1002. The turbine generator 1018 may be generating electric power and providing that electric power the main AC bus 1002 via inverters 1022 and 1024. The second load bank 1026 may be drawing power generated by the turbine generator 1018 such that no power is supplied from the turbine generator 1018 to the main AC bus 1002. The backup generator 1028 may not be generating electric power, providing electric power to the AC output bus 1030, not providing electric power to the main AC bus 1002, or a combination of the foregoing. The UPS 1032 may be drawing power from the main AC bus 1002.

Some of the flow of electric power shown in FIG. 15 may correspond to those flows in FIG. 14. For example, the electric power generated by fuel cell 1010 may flow to the DC output bus 1012 and the main AC bus 1002 as shown by arrow 1142, corresponding to the flow of arrow 1134. This correspondence may be the general direction of power flow, the total electric power of the flow, or a combination of these characteristics. Similarly, arrow 1144 may correspond to arrow 1140, and arrow 1146 may correspond to arrow 1138.

One difference between embodiments illustrated in FIG. 15 and FIG. 14 is that turbine generator 118 may be generating power as indicated by arrow 1148. This flow is converted from AC power on the AC output bus 1020 to DC power by inverter 1022. Inverter 1022 may be configured to convert the AC power on the AC output bus 1020 to a DC power of a particular voltage. The particular conversion performed by inverter 1022 may also control the torque placed on the turbine generator 1018 that may help control the speed of the turbine generator 1018, and therefore the amount of oxidant or other fluid flowing to fuel cell 1010 due to the connection of the compressor to the turbine generator 1018.

Another difference is that the total electric power provided to main AC bus 1002 may be combination of the power generated by the fuel cell 110 and the turbine generator 118 (if load bank 1026 does not draw all power generated by the turbine generator 1018). Consequently, the power consumed by load bank 1016 may be an amount equal to the difference between the power generated by the fuel cell 1010 and turbine generator 1018 and the power consumed by the UPS 1032 and control system 1034 plus any other losses in the system and any power consumed by the second load bank 1026. In some embodiments, and as described above, the first and second load banks 1016 and 1026 may be configured for interoperability wherein both or either my draw power from the fuel cell 1010, turbine generator 1018, or both.

With the turbine generator 1018 being powered by the expansion of combustion products through a turbine, the electric power produced by turbine generator 1018 may be more than that needed to operate the fuel cell power plant. Given the above described interrelated mechanical (e.g., turbine generator 1018 supplying fuel cell 1010 with air) and electric (e.g., combined power outputs of the turbine generator 1018 and fuel cell 1010) operations of the turbine generator 1018 and fuel cell 1010, the load bank 1016 may be required to consume a portion of the power generated by both the turbine generator 1018 and fuel cell 1010 such that these components can safely interoperate.

In some embodiments, the second load bank 1026 may be configured to draw all power generated by the turbine generator 1018 when both the fuel cell 1010 and turbine generator 1018 are providing power while the fuel cell power plant is disconnected from EPDS 1004. Providing this second load bank 1026 may provide for easier operation of the fuel cell system wherein the electric outputs of the fuel cell 1010 and the turbine generator need not be combined. The second load bank further provides for less dependency and interrelated electric operation of the turbine generator 1018 and fuel cell 1010.

Figure 16:
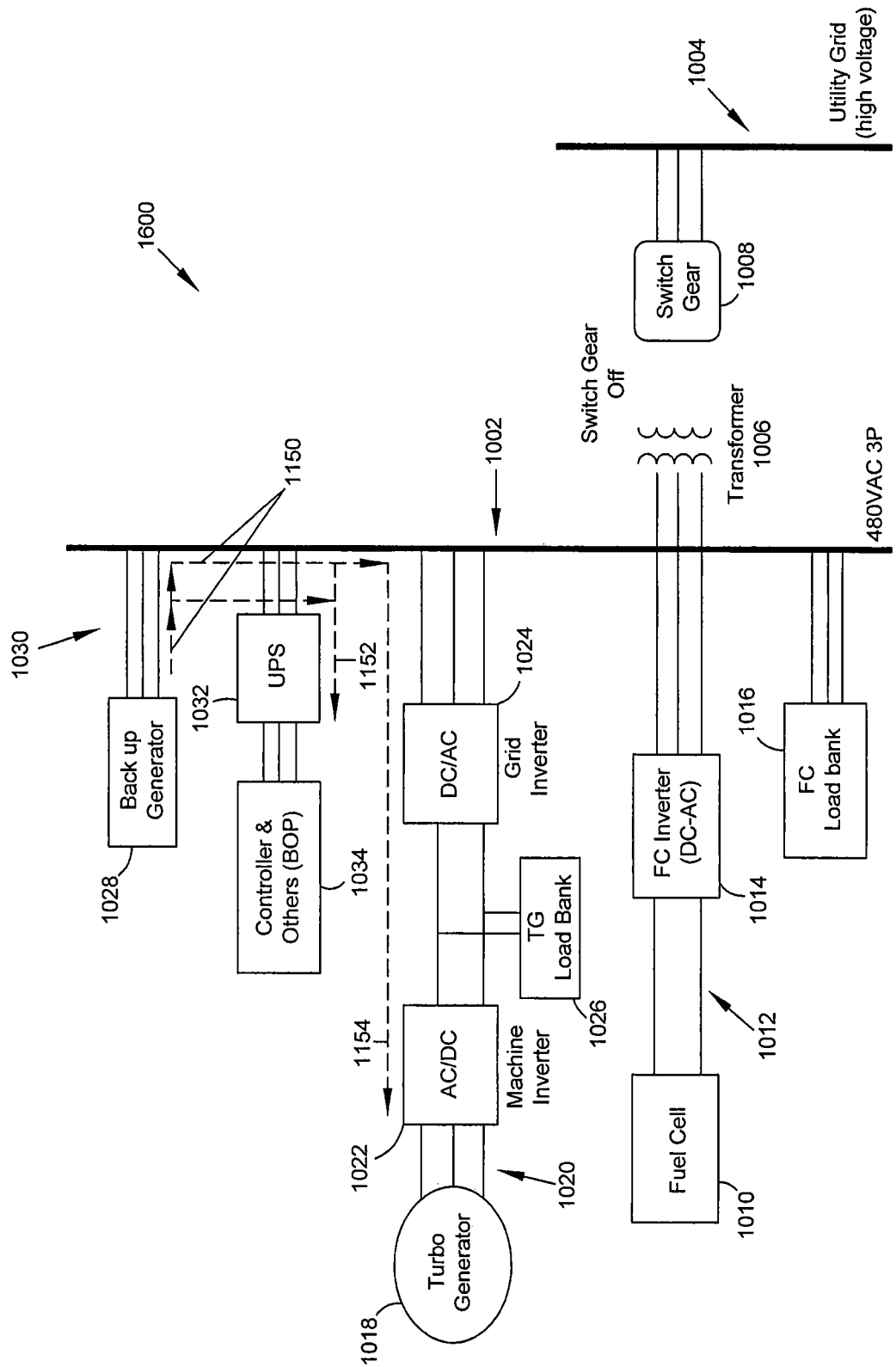
FIG. 16 is a schematic diagram of an electric system decoupled from an electric power distribution system and a backup generator providing electric power to the electric system in accordance with some embodiments of the present disclosure.

In accordance with some embodiments of the present disclosure, an electric system 1600 is illustrated in FIG. 16. The electric system 1600 may comprise a main AC bus 1002, an electric power distribution system (EPDS) 1004, a transformer 1006, a switch gear 1008, a fuel cell 1010, a DC output bus 1012, an inverter 1014, a first load bank 1016, a turbine generator 1018, an AC output bus 1020, an inverter 1022, an inverter 1024, a second load bank 1026, a backup generator 1028, an AC output bus 1030, an uninterruptible power supply (UPS) 1032 and a control system 1034 that may be similar to those components described above.

As shown in FIG. 16, the main AC bus 1002 may be electrically decoupled form the EPDS 1004. The fuel cell 1010 may not be generating electric power, providing any generated electric power to the main AC bus 1002 through the DC output bus 1012, or both. The turbine generator 1018 may be drawing power from the main AC bus 1002 through inverters 1022 and 1024 and operating in a motoring mode. The backup generator 1028 may be generating and providing electric power to the main AC bus 1002. The UPS 1032 may be drawing electric power from the main AC bus 1002.

The fuel cell 1010 may not be generating or otherwise providing electric power to the DC output bus 1012 for some reason, e.g., a loss of fuel flow, oxidant flow, or both, an electric problem for which the fuel cell 1010 should be isolated from the rest of the fuel cell power plant, the fuel cell 1010 may be starting-up or shutting-down or for some other reason. Even though the fuel cell 1010 may not be providing electric power to the rest of the fuel cell power plant, the compressor of the turbine generator 1018 may still provide a flow of oxidant or other fluid to the fuel cell for heat balance, heat-up, cool-down, or other fuel cell 1010 operations. The electric power to operate turbine generator 1018 in a motoring mode may be provide by backup generator 1028. In some embodiments, the electric power to operate turbine generator 1018 may be provided by the UPS 1032, the load bank 1016, load bank 1026, or some combination of the foregoing, possibly in conjunction with or separate from the backup generator 1028. The backup generator 1028 may also be used to provide electric power to the UPS 1032 that, in turn, provides a steady supply of power to the control system 1034. In some embodiments, load banks 1016 and 1026 may also provide electric power to the UPS 1032.

The flows of electric power are illustrated on FIG. 16. Arrow 1150 shows the backup generator 1028 supplying generated electric power to the AC output bus 1030 and main AC bus 1002. From the main AC bus 1002, electric power may flow to the turbine generator 1018 as shown by arrow 1154. The electric power flowing to turbine generator 1018 may flow through inverters 1022 and 1024. Inverter 1022 may be configured to provide the required current, voltage, phase(s), real and reactive power, or a combination of these, on the AC output bus 1020 in order to control the rotational speed of turbine generator 1018, thereby effecting the resultant flow of oxidant or other fluid through the fuel cell 1010 caused by the compressor of turbine generator 1018.

Electric power may also flow from the main AC bus 1002 to the UPS 1032 as shown by arrow 1152. The UPS 1032 may provide a continuous supply of electric power to control system 1034.

Figure 17:
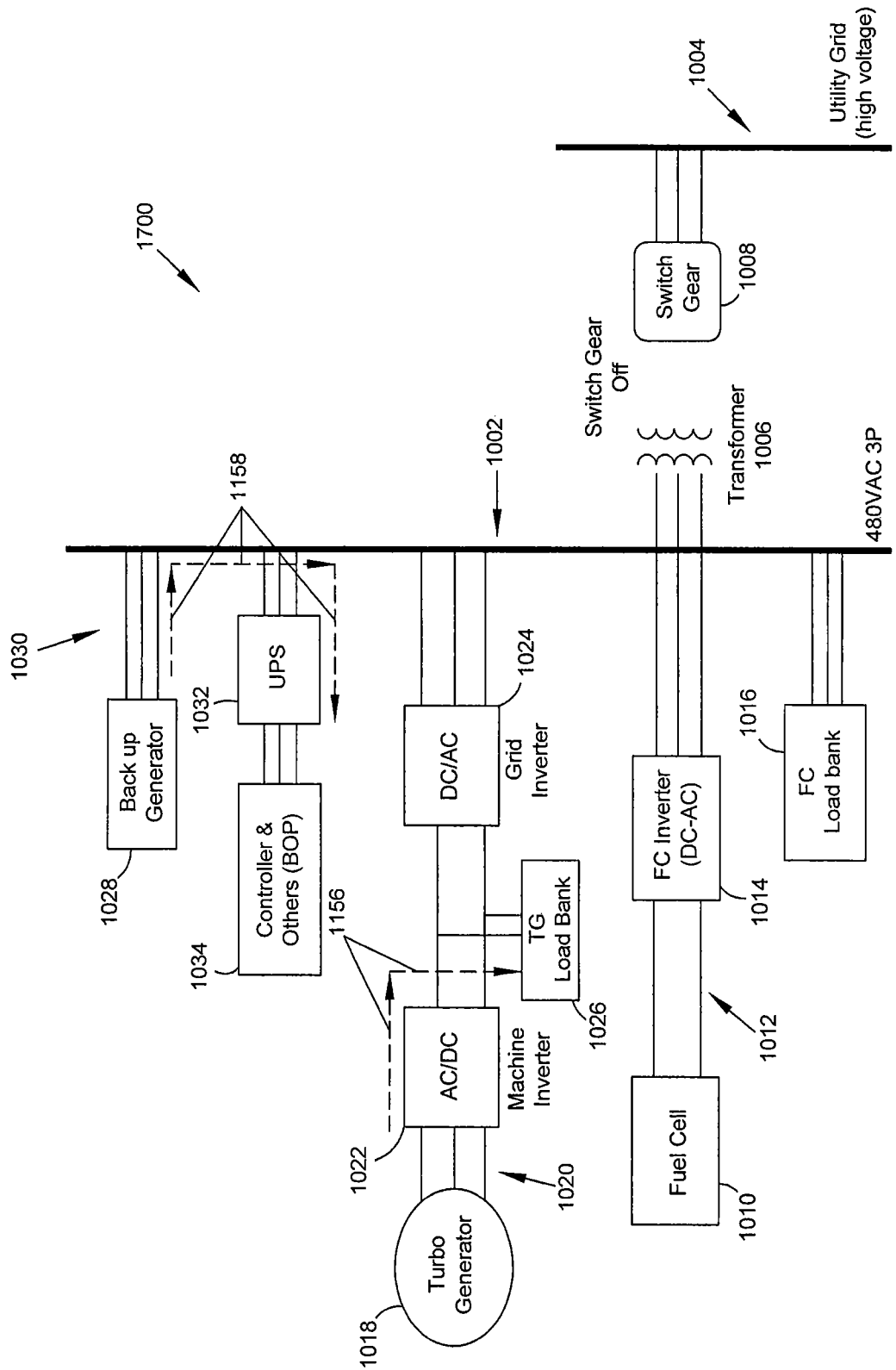
FIG. 17 is a schematic diagram of an electric system decoupled from an electric power distribution system and a turbine generator and a backup generator providing electric power to the electric system in accordance with some embodiments of the present disclosure.

In accordance with some embodiments of the present disclosure, an electric system 1700 is illustrated in FIG. 17. The electric system 1700 may comprise a main AC bus 1002, an electric power distribution system (EPDS) 1004, a transformer 1006, a switch gear 1008, a fuel cell 1010, a DC output bus 1012, an inverter 1014, a first load bank 1016, a turbine generator 1018, an AC output bus 1020, an inverter 1022, an inverter 1024, a second load bank 1026, a backup generator 1028, an AC output bus 1030, an uninterruptible power supply (UPS) 1032 and a control system 1034 that may be similar to those components described above.

As shown in FIG. 17, the main AC bus 1002 may not be electrically coupled to the EPDS 1004. The fuel cell 1010 may not be generating electric power, providing electric power to the main AC bus 1002 through the DC output bus 1012, or both. The turbine generator 1018 may be generating electric power and providing that electric power to the main AC bus 1002 through inverters 1022 and 1024, or to load bank 1026 or 1016, or some combination of the foregoing. The backup generator 1028 may be generating electric power and providing that power to the main AC bus 1002 via the AC output bus 1030. The UPS 1032 may be drawing power from the main AC bus 1002 and providing power to the control system 1034.

The fuel cell 1010 may not be generating or otherwise providing electric power to the DC output bus 1012 for reasons similar to those described above. While the fuel cell 1010 may not be providing electric power, a flow of oxidant or other fluid may still be provided to the fuel cell 1010 for start-up, shut-down, heat-up, cool-down or other operations needed to operate the fuel cell 1010 in a safe manner. The flow of this fluid may be provided by the turbine generator 1018 via a compressor which pressurizes and supplies the oxidant or other fluid to the fuel cell 1010. As the flow requirements in the fuel cell 1010 lower, the compressor may need to provide lower flowrates of the oxidant, or other fluid, to fuel cell 1010, less compression of the oxidant or other fluid, or both. These lower flowrates or lower compression may be achieved by slowing the rotation of the compressor of turbine generator 1018. Consequently, the electric output produced by the turbine generator 1018 may vary over time. This varying electric output of the turbine generator 1018 may at some point reach a level where the turbine generator 1018 may no longer be relied upon to provide a steady power supply to the UPS 1032, and from there to the control system 1034. In some embodiments, electrical power drawn from the turbine generator 1018 in order to slow the generator down.

To avoid issues that may arise from the lack of constant power supply from the turbine generator 1018, the backup generator 1028 may be started to provide electric power. The backup generator 1028, having no mechanical interoperation with the fuel cell 1010, does not have the same external operating requirements as does the turbine generator 1018, and therefore may provide a more reliable source of electric power to the UPS 1032 and control system 1034.

The load bank 1016. 1026, or both may be configured to draw an amount of power equal to the difference between the power generated by the turbine generator 1018 and backup generator 1028 and the amount of power drawn by the UPS 1032 and any system losses. The load banks 1016,1026 or both may begin drawing power from the main AC bus 1002 as soon as the backup generator 1028 is providing power to the main AC bus 1002. In some embodiments, the start-up of backup generator 1028 may be based on the expected time at which the turbine generator 1018 may no longer be capable of providing a constant supply of power to keep UPS 1032 charged as UPS 1032 continuously supplies power to control system 1034. In some embodiments, the backup generator 1028 may be supplying power the main AC bus 1002 prior to the above mentioned point. During this period the load banks 1016, 1026, or both may draw an amount of power equal to that generated and place on the main AC bus by the turbine generator.

The flow of electric power is illustrated in FIG. 16. Turbine generator 1018 generates some electric power that is provided from the AC output bus 1020 through inverter 1022, and to the load bank 1026 as represented by arrows 1156. In some embodiments, the power generated by the turbine generator 1018 may also, in whole or in part, flow through inverter 1024 to the main AC bus 1002. Load Bank 1016 may be configured to draw any excess power on the main AC bus 1002.

The backup generator 1028 provides power to the UPS 1032 via the main AC bus 1002 and the AC output bus 1030 as shown by arrow 1158. As can be seen in FIG. 16, both the turbine generator 1018 and backup generator 1028 may be configured to supply power to the UPS 1032. Excess power generated by the turbine generator 1018, and possibly the backup generator 1028, may also be drawn by the load bank 1016.

Figure 18:
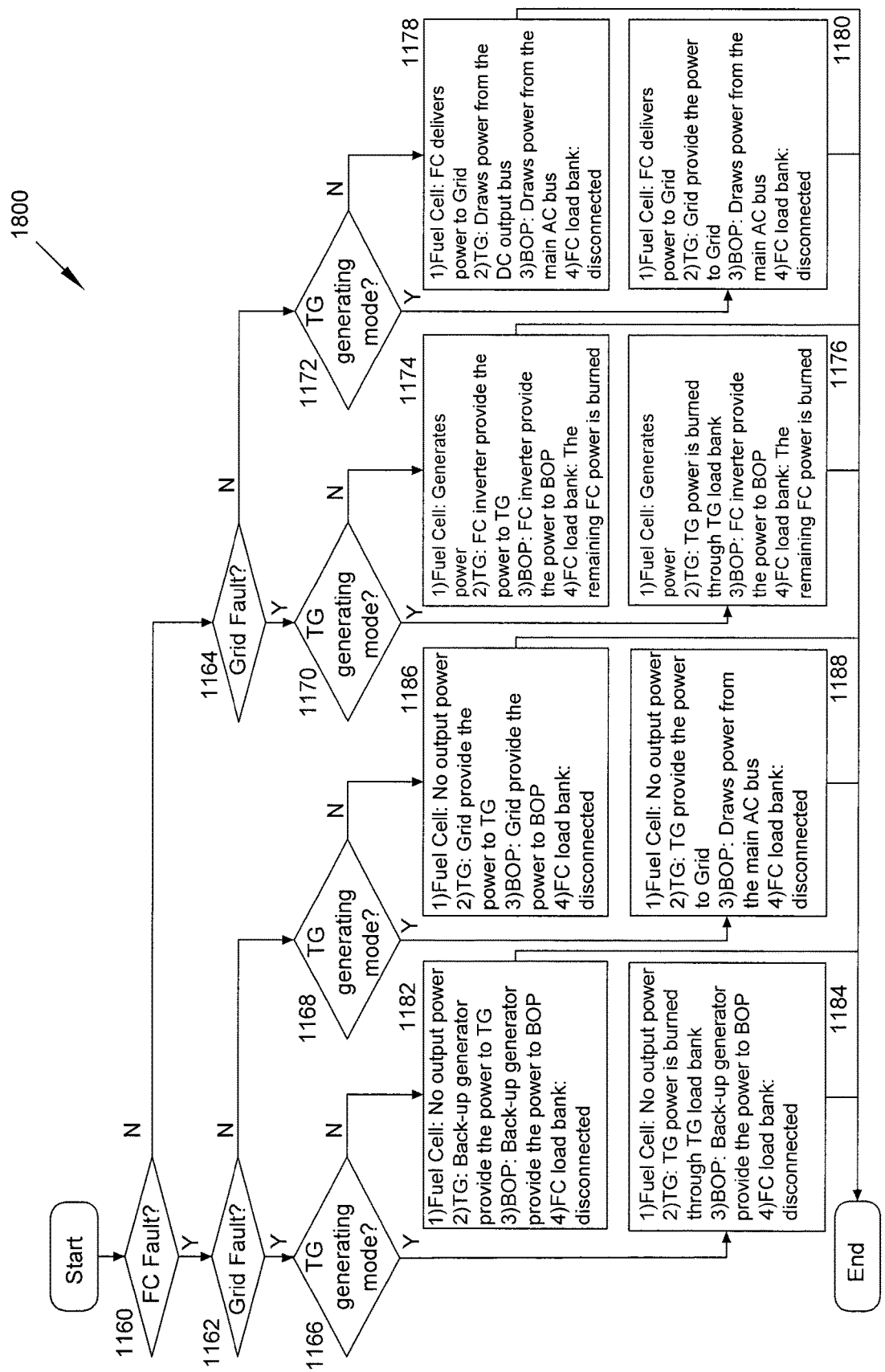
FIG. 18 is an operational-state flow diagram for an electric system in accordance with some embodiments of the present disclosure.

In accordance with some embodiments of the present disclosure an operational-state flow diagram 1800 for an electric system in accordance with some embodiments of the present disclosure is illustrated in FIG. 18. The electric system may be similar to the electric systems 100, 200, 300, 400, 500, 600, 700 and 800, 1000, 1100, 1200, 1300, 1400, 1500, 1600, 1700 as described above.

The operation-state flow diagram 1800 illustrates the possible operating conditions and power flows to and from electric system components based on the operating state of one or more components of the electric system. For example, the operational condition and power flows to and from various components in the electric system are dependent on the operating state of the electric system fuel cell (Block 1160), the electric power distribution system (Blocks 1162 and 1164) and the turbine generator (Blocks 1166, 1168, 1170 and 1172).

If the fuel cell is generating electric power and does not have a fault (Block 1160 "No" branch), the electric system may have four possible operating states (Blocks 1174, 1176, 1178 and 1180) based on the operating condition of the electric power distribution system (Block 1164) and the turbine generator (Blocks 1170 and 1172). For example, if the electric system (also known as a power plant or fuel cell power plant) is electrically coupled to the electric power distribution system (Block 1164, "No" branch) the fuel cell may operate in a power generating mode that provides power to the electric power distribution system (as described above), the control system may be operated by drawing power from the main AC bus (as described above) and the first load bank may be disconnected from the main AC bus. If the turbine generator is operating in a power generating mode, the turbine generator will provide that power to the electric power distribution system (as described above). This operational state is indicated by Block 1180. If the turbine generator is operated in a motoring mode, the turbine generator will draw power from the DC output bus (as described above). This operational state is indicated by Block 1178.

If the fuel cell is generating electric power and does not have a fault (Block 1160 "No" branch), and if the electric system (also known as a power plant or fuel cell power plant) is decoupled from the electric power distribution system (Block 1164, "Yes" branch) the fuel cell will operate in a power generating mode that provides power to the main AC bus (as described above), the control system will be operated by drawing power from the main AC bus (as described above) and the first load bank may be electrically coupled to and draw power from the main AC bus (as described above). If the turbine generator is operating in a power generating mode, the turbine generator will provide that power to the main AC bus, the second load bank, or both (as described above). This operational is indicated by Block 1176. If the turbine generator is operated in a motoring mode, the turbine generator will draw power from the main AC bus (as described above). This operational state is indicated by Block 1174. Either load bank may draw an amount of power equal to the difference between the power generated by the fuel cell, any power generated by the turbine generator and the power drawn by the control system, any power drawn by the turbine generator and any electric losses. In some embodiments, the second load bank will draw any power generated by the turbine generator, and the first load bank will draw an amount of power equal to the difference between the power generated by the fuel cell and the power consumed by the control system and system losses, and any power consumed by the turbine generator.

If the fuel cell is not generating electric power, has a fault, or both (Block 1160 "Yes" branch), the electric system may have four possible operating states (Blocks 1182, 1184, 1186 and 1188) based on the operating condition of the electric power distribution system (Block 1162) and the turbine generator (Blocks 1166 and 1168). For example, if the electric system (also known as a power plant or fuel cell power plant) is electrically coupled to the electric power distribution system (Block 1162, "No" branch) the fuel cell will not operate in a power generating mode that provides power to the electric power distribution system (as described above), the control system will be operated by drawing power from the main AC bus (as described above) and the load bank will be disconnected from the main AC bus (as described above). If the turbine generator is operating in a power generating mode, the turbine generator will provide that power to the electric power distribution system (as described above). This operational is indicated by Block 1188. If the turbine generator is operated in a motoring mode, the turbine generator will draw power from the main AC Bus (as described above). This operational state is indicated by Block 1186.

If the fuel cell is not generating electric power, has a fault, or both (Block 1160 "Yes" branch), and if the electric system (also known as a power plant or fuel cell power plant) is electrically decoupled from the electric power distribution system (Block 1162, "Yes" branch) the fuel cell will not operate in a power generating mode that provides power to the main AC bus (as described above), the control system will be operated by drawing power from the main AC bus (as described above), the first, second, or both load banks will be electrically coupled to and draw power from the main AC bus or from the turbine generator inverter (e.g. inverter 1022) (as described above) and the backup generator will provide power to the main AC bus (as described above). If the turbine generator is operating in a power generating mode, the turbine generator will provide that power to the main AC bus or to the second load bank (as described above). This operational is indicated by Block 1184. If the turbine generator is operated in a motoring mode, the turbine generator will draw power from the main AC bus (as described above). This operational state is indicated by Block 1182. The first load bank may draw an amount of power equal to the difference between any power generated by the backup generator and the turbine generator, and the power drawn by the control system, the turbine generator, and system losses.

As will be appreciated by one skilled in the art, the foregoing embodiments are illustrated using simplified system diagrams. Particular embodiments may contain a greater number of components, e.g., electric connections, instrumentation and breakers. Additionally, while many of the foregoing components are illustrated as a single box, each component may be comprised of a number of subcomponents, or multiple components capable of operating together to provide for the indicated purpose.

The present disclosure provides for power electronics coupled to a power plant that may have a fuel cell and turbine generator, coupled either by AC or DC means. These systems provide the benefits of increased redundancy, reliability and interoperability of the various components of the fuel cell power plant system. For example, the fuel cell output may be used to motor the turbine generator and power the power plant control system in the case of a fault on the electric power distribution system. The power generated by the turbine generator can be used to power the control system in abnormal conditions such as when a fault occurs on the electric power distribution system and the fuel cell. The systems disclosed herein may have a backup generator that provides power to the control system and turbine generator when operating in a motoring mode during abnormal conditions such as when a fault occurs on the electric power distribution system and the fuel cell is not generating power. The electric systems disclosed here are more reliable and safer in normal and abnormal conditions. Additionally, some embodiments of the disclosed systems allow for a reduction in the number of electric converting components thereby improving the efficiency of plant operations, and, in particular, the efficiency of the turbine generator power electronics. The foregoing systems are compatible with public utility grids and easily expandable and combinable with net-parallel and isolated power generation. Installation is simplified and it is possible to use standard household installation components.

While some of the above embodiments have been provided in the context of a particular apparatus, it will be understood that the above embodiments disclose improvements to electric systems having a fuel cell. While preferred embodiments of the present disclosure have been described, it is to be understood that the embodiments described are illustrative only and that the scope of the disclosure is to be defined solely by the appended claims when accorded a full range of equivalence. Many variations and modifications naturally occurring to those of skill in the art from a perusal hereof.

We claim:

1. An electric system comprising:
    a main AC bus, said bus being electrically coupleable to an electric power distribution system by a transformer and switch gear;
    a fuel cell having a DC output bus, said fuel cell DC output bus being electrically coupled to said main AC bus by a fuel cell inverter;
    a load bank electrically coupled to said main AC bus;
    a turbine generator having an AC output bus, said turbine generator AC output bus being electrically coupled to said fuel cell DC output bus by a machine inverter;
    a backup generator having an AC output bus electrically coupled to said main AC bus;
    an uninterruptible power supply (UPS) electrically coupled to said main AC bus; and
    a control system electrically coupled to said UPS,
    wherein:
        said main AC bus is not electrically coupled to said electric power distribution system;
        said fuel cell is generating and providing DC power to said fuel cell DC output bus;
        said load bank is drawing power from said main AC bus;
        said turbine generator is drawing power from said fuel cell DC output bus;
        said backup generator is not providing AC power to said backup generator AC output bus; and
        said UPS is drawing power from said main AC bus.

2. The electric system of claim 1, wherein said load bank draws an amount of power equal to the difference between the power generated by said fuel cell and the power drawn by said UPS and said turbine generator.

3. A method of operating a power plant having a fuel cell and a turbine generator each capable of providing electric power to an electric power distribution system, said method comprising:
    when the power plant is disconnected from the electric power distribution system:
        operating the fuel cell in a power generating mode to provide power to a main AC bus and to the turbine generator;
        operating the turbine generator in a motoring mode, said turbine generator drawing power from a fuel cell DC output bus;
        operating the control system of said power plant, said control system drawing power from the main AC bus of the power plant through an uninterruptible power supply (UPS) electrically connected to said control system and to said main AC bus; and
        providing a load bank to draw power from the main AC bus;
        without operating a backup generator to provide power to the main AC bus.

4. The method of claim 3, further comprising:
    drawing, with said load bank, an amount of power equal to difference between the power generated by said fuel cell and the power drawn by said control system, and any power provided to the turbine generator.

5. The method of claim 3, further comprising:
providing power from the fuel cell DC output bus to said main AC Bus through a fuel cell inverter.

* * * * *